US012811934B2

(12) United States Patent
Chen et al.

(10) Patent No.: US 12,811,934 B2
(45) Date of Patent: Nov. 24, 2026

(54) ACCESS CONTROL METHOD, ACCESS CONTROL SYSTEM, AND RELATED DEVICE

(71) Applicant: HUAWEI TECHNOLOGIES CO., LTD., Shenzhen (CN)

(72) Inventors: Lijian Chen, Hangzhou (CN); Jiaji Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 18/403,744

(22) Filed: Jan. 4, 2024

(65) Prior Publication Data

US 2024/0146728 A1 May 2, 2024

Related U.S. Application Data

(63) Continuation of application No. PCT/CN2022/083469, filed on Mar. 28, 2022.

(30) Foreign Application Priority Data

Jul. 8, 2021 (CN) ......................... 202110770853.3
Jul. 23, 2021 (CN) ......................... 202110838315.3

(51) Int. Cl.
*H04L 9/40* (2022.01)

(52) U.S. Cl.
CPC .......... *H04L 63/0876* (2013.01); *H04L 63/08* (2013.01); *H04L 63/10* (2013.01); *H04L 63/102* (2013.01)

(58) Field of Classification Search
CPC ... H04L 63/0876; H04L 63/10; H04L 9/3213; H04L 63/08; H04L 63/102; H04L 9/0894; H04L 9/40; H04L 63/1441
(Continued)

(56) References Cited

U.S. PATENT DOCUMENTS 10,700,873 B2 * 6/2020 Kinney ................. H04L 9/3247
11,159,326 B1 * 10/2021 Nelson .................. G06F 3/0484
(Continued)

FOREIGN PATENT DOCUMENTS

CN 110830447 A 2/2020
CN 113055357 A * 6/2021 ......... H04L 63/1458
CN 113141327 A * 7/2021 ............ H04L 63/10

OTHER PUBLICATIONS

Csa:"Software-Defined Perimeter (SDP) Specification 2.0",Jun. 24, 2021,total 33 pages,XP093012375.
(Continued)

*Primary Examiner* — Khanh Q Dinh

(57) ABSTRACT

This application relates to the field of network security technologies, and provides an access control method, an access control system, and a related device, to improve security of a protected application resource. The method includes: An SDP controller receives a first packet sent by a first SDP client device, where a TCP option field of the first packet carries a device identifier of the first SDP client device. The SDP controller performs single-packet authentication on the first SDP client device based on the device identifier of the first SDP client device. If the single-packet authentication on the first SDP client device fails, the SDP controller disables a TCP connection between the first SDP client device to which the first packet belongs and the SDP controller.

25 Claims, 7 Drawing Sheets

(58) Field of Classification Search
USPC .................................. 709/220, 223, 224–229
See application file for complete search history.

(56) References Cited

U.S. PATENT DOCUMENTS

| | | | | |
|---|---|---|---|---|
| 11,159,576 | B1 * | 10/2021 | Ly | G06F 9/451 |
| 12,355,901 | B2 * | 7/2025 | Yan | G06F 21/606 |
| 2017/0041146 | A1 * | 2/2017 | Davis | H04L 9/0872 |
| 2017/0041151 | A1 * | 2/2017 | Kommireddy | H04L 9/3228 |
| 2019/0116179 | A1 * | 4/2019 | Xu | H04L 9/3226 |
| 2019/0230032 | A1 * | 7/2019 | Landau | H04L 45/56 |
| 2020/0145209 | A1 * | 5/2020 | Yang | G06F 16/2379 |
| 2020/0389437 | A1 * | 12/2020 | Miller | H04L 63/0236 |
| 2020/0403787 | A1 * | 12/2020 | Islam | H04L 9/0852 |
| 2021/0167953 | A1 * | 6/2021 | Islam | H04L 9/3242 |
| 2021/0266309 | A1 * | 8/2021 | Guccione | H04L 63/0815 |
| 2021/0314297 | A1 * | 10/2021 | Peterson | H04L 63/0263 |
| 2022/0141662 | A1 * | 5/2022 | Liao | H04W 12/08 726/1 |
| 2022/0247285 | A1 * | 8/2022 | Mizushima | H02K 15/35 |
| 2022/0247761 | A1 * | 8/2022 | Subbanna | H04L 63/20 |
| 2022/0247768 | A1 * | 8/2022 | Datar | H04L 63/1416 |

OTHER PUBLICATIONS

Csa:"Software Defined Perimeter for Infrastructure as a Service",Cloud Security Alliance,Feb. 13, 2017,total 42 pages,XP093129026.

* cited by examiner

ACCESS CONTROL METHOD, ACCESS CONTROL SYSTEM, AND RELATED DEVICE

CROSS-REFERENCE TO RELATED APPLICATIONS

This application is a continuation of International Application No. PCT/CN2022/083469, filed on Mar. 28, 2022, which claims priority to Chinese Patent Application No. 202110770853.3, filed on Jul. 8, 2021, and Chinese Patent Application No. 202110838315.3, filed on Jul. 23, 2021. All of the aforementioned patent applications are hereby incorporated by reference in their entireties.

TECHNICAL FIELD

This application relates to the field of network security technologies, and in particular, to an access control method, an access control system, and a related device.

BACKGROUND

A software defined perimeter (SDP) is an identity-based resource access control technology proposed by the Cloud Security Alliance. Based on the SDP technology, identity authentication is first performed on a user and a device used by the user before a terminal device access is granted to resources. If the authentication succeeds, the user can access the resources by using the device. If the authentication fails, the user cannot access the resources by using the device. Therefore, the SDP technology can ensure resource isolation and security.

An access control system based on the SDP technology usually includes an SDP controller, an SDP client, and an SDP gateway. The SDP client and the SDP gateway separately establish a bidirectional connection with the SDP controller. When the SDP client needs to access a protected application resource, the SDP client first initiates authentication to the SDP controller. After the authentication succeeds, the SDP controller sends, to the SDP gateway, information such as a source IP address that needs to be allowed, and a destination port. The SDP client then sends an access request to the SDP gateway. The SDP gateway determines whether the source IP address of the SDP client is valid, and allows corresponding access when it is determined that the source IP address of the SDP client is valid.

At present, a case in which a plurality of SDP clients perform access, using a same source IP address after translation, is performed by a source network address translation (SNAT) device. In this case, source IP addresses of data packets received by the SDP gateway from the plurality of SDP clients are the same, and the SDP gateway cannot distinguish between IP addresses before the translation by the SNAT device. In this case, provided that authentication on one SDP client in the plurality of SDP clients succeeds, the remaining SDP clients that are not authenticated can access the protected application resource by using the source IP address, resulting in some security risks.

SUMMARY

This application provides an access control method, an access control system, and a related device, to improve security of a protected application resource.

To achieve the foregoing objective, the following technical solutions are used in this application.

According to a first aspect, an access control method is provided. The method includes: An SDP controller receives a first packet sent by a first SDP client device. A transmission control protocol TCP option field of the first packet carries a device identifier of the first SDP client device. The SDP controller performs single-packet authentication on the first SDP client device based on the device identifier of the first SDP client device. If the single-packet authentication on the first SDP client device fails, the SDP controller disables a TCP connection between the first SDP client device to which the first packet belongs and the SDP controller.

In the foregoing technical solution, the first SDP client sends the first packet to the SDP controller. The TCP option field of the first packet carries the device identifier of the first SDP client device. When receiving the first packet, the SDP controller performs the single-packet authentication on the first SDP client device based on the device identifier of the first SDP client device. If the single-packet authentication on the first SDP client device fails, the SDP controller disables the TCP connection between the first SDP client device to which the first packet belongs and the SDP controller. In this way, when a plurality of SDP client devices use a same source IP address after translation is performed by a same SNAT device, the SDP controller can identify different SDP client devices based on device identifiers of the SDP client devices, so that security of a protected application resource can be ensured. Furthermore, the first SDP client includes the device identifier of the first SDP client device in the TCP option field of the first packet but not in another protocol layer above a TCP transport layer, so that there is no need to create a socket, and there is no need to read and parse application layer data of a packet, thereby reducing system overheads of the SDP controller.

Optionally, in a design of the first aspect, the method further includes: The SDP controller receives a first packet sent by a second SDP client device. A TCP option field of the first packet sent by the second SDP client device carries a device identifier of the second SDP client device. The SDP controller performs single-packet authentication on the second SDP client device based on the device identifier of the second SDP client device. If the single-packet authentication on the second SDP client device succeeds, the SDP controller receives a second packet sent by the second SDP client device. A transport layer security TLS option field or an application layer packet header of the second packet carries authentication information. The authentication information includes user information of the second SDP client device. The SDP controller performs user authentication on the second SDP client device based on the device identifier and the user information of the second SDP client device. If the user authentication on the second SDP client device succeeds, the SDP controller sends a resource list to the second SDP client device. The resource list includes an identifier of at least one application server allowing for access by the second SDP client device. In the foregoing design, the SDP controller sends the resource list to the second SDP client device only when the single-packet authentication and the user authentication performed by the SDP controller on the second SDP client device succeed. In this way, when a plurality of SDP client devices use a same source IP address after translation is performed by a same SNAT device, an SDP client device that fails to be authenticated in the plurality of SDP client devices cannot access a protected application resource, so that the security of the protected application resource can be improved.

Optionally, in a design of the first aspect, the first packet and the second packet that are sent by the second SDP client device are packets in a same TCP connection; or the first packet and the second packet that are sent by the second SDP client device are packets in different TCP connections. In the foregoing design, the second SDP client device can separately perform the single-packet authentication and the user authentication by using two packets in a same TCP connection, or can separately perform the single-packet authentication and the user authentication by using two packets in different TCP connections, so that flexibility of the authentication can be improved.

Optionally, in a design of the first aspect, if the first packet and the second packet that are sent by the second SDP client device are the packets in the different TCP connections, before the SDP controller receives the second packet sent by the second SDP client device, the method further includes: The SDP controller sends a salt value to the second SDP client device based on the first packet sent by the second SDP client device. The second packet further carries the salt value. After the SDP controller receives the second packet sent by the second SDP client device, the method further includes: The SDP controller determines, based on the salt value carried in the second packet, that the single-packet authentication on the second SDP client device has succeeded. In the foregoing design, if the first packet and the second packet that are sent by the second SDP client device are packets in different TCP connections, the salt value sent by the SDP controller based on the first packet is further carried in the second packet, so that the SDP controller can determine, based on the salt value carried in the second packet, that the single-packet authentication on the second SDP client device has succeeded.

Optionally, in a design of the first aspect, the first packet sent by the first SDP client device is a synchronous SYN packet, and the first packet sent by the second SDP client device is an SYN packet.

Optionally, in a design of the first aspect, the device identifier carried in the first packet sent by the first SDP client device is a device identifier in a ciphertext form. The method further includes: The SDP controller decrypts the device identifier in the ciphertext form by using a sequence number of the SYN packet used as the first packet to obtain a character string of a specified length. The character string is used by the SDP controller to perform the single-packet authentication on the first SDP client device. Similarly, the device identifier carried in the first packet sent by the second SDP client device is a device identifier in a ciphertext form. The method further includes: The SDP controller decrypts the device identifier in the ciphertext form by using a sequence number of the SYN packet used as the first packet to obtain a character string of a specified length. The character string is used by the SDP controller to perform the single-packet authentication on the second SDP client device. In the foregoing design, the device identifier carried in the first packet is encrypted, so that security of the device identifier transmitted over a network can be ensured, thereby avoiding a case in which after intercepting the first packet, an unauthorized SDP client device obtains a device identifier of an authorized SDP client device from the first packet, to perform a malicious activity by masquerading the authorized SDP client device.

Optionally, in a design of the first aspect, that the SDP controller performs single-packet authentication on the first SDP client device based on the device identifier of the first SDP client device includes: The SDP controller compares the character string with a stored character string corresponding to each registered SDP client device. The character string corresponding to the registered SDP client device is generated based on a device identifier in a plaintext form of the registered SDP client device. If the character string is the same as a character string corresponding to a registered SDP client device, it is determined that the single-packet authentication succeeds.

Optionally, in a design of the first aspect, if the user authentication on the second SDP client device succeeds, the method further includes: The SDP controller sends token information to the second SDP client device. The token information is used by an SDP gateway to verify resource access initiated by the second SDP client device. In the foregoing design, the SDP controller sends the token information to the second SDP client device, so that the second SDP client device carries the token information when subsequently initiating the resource access to the SDP gateway. The SDP gateway performs, based on the token information in a resource access request, valid verification on the resource access initiated by the second SDP client device.

Optionally, in a design of the first aspect, if the user authentication on the second SDP client device succeeds, the method further includes: The SDP controller sends client information to the SDP gateway. The client information indicates that authentication on the second SDP client device succeeds. The client information includes a device identifier of the second SDP client device. In the foregoing design, if the user authentication on the second SDP client device succeeds, the SDP controller sends the client information to the SDP gateway, so that the SDP gateway determines, based on the client information, validity of the resource access sent by the SDP client device, to ensure security of a protected application resource.

According to a second aspect, an access control method is provided. The method includes: An SDP client device sends a first packet to an SDP controller. A transmission control protocol TCP option field of the first packet carries a device identifier of the SDP client device. In this way, when the SDP controller receives the first packet, the SDP controller can identify different SDP client devices by using the device identifiers of the SDP client devices, so that a problem that different SDP client devices cannot be identified when a plurality of SDP client devices use a same source IP address after translation is performed by a same SNAT device can be avoided, thereby ensuring security of a protected application resource. In addition, the SDP client includes the device identifier of the SDP client device in the TCP option field of the first packet but not in another protocol layer above a TCP transport layer, so that there is no need to create a socket, and there is no need to read and parse application layer data, thereby reducing system overheads of the SDP controller.

Optionally, in a design of the second aspect, the method further includes: The SDP client device receives a single-packet authentication response sent by the SDP controller. If the single-packet authentication response indicates that single-packet authentication performed by the SDP controller on the SDP client device succeeds, the SDP client device sends a second packet to the SDP controller. A transport layer security TLS option field or an application layer packet header of the second packet carries authentication information. The authentication information includes user information of the SDP client device. The SDP client device receives a resource list returned by the SDP controller. The resource list includes an identifier of at least one application server allowing for access by the SDP client device. In the foregoing design, the SDP client device can receive the resource list only when the single-packet authentication and user authentication performed by the SDP controller on the SDP client device succeed. In this way, when a plurality of SDP client devices use a same source IP address after translation is performed by a same SNAT device, an SDP client device that fails to be authenticated in the plurality of SDP client devices cannot a protected application resource, so that the security of the protected application resource can be improved.

Optionally, in a design of the second aspect, the first packet and the second packet are packets in a same TCP connection; or the first packet and the second packet are packets in different TCP connections. In the foregoing design, a second SDP client device can separately perform the single-packet authentication and the user authentication by using two packets in a same TCP connection, or can separately perform the single-packet authentication and the user authentication by using two packets in different TCP connections, so that flexibility of the authentication can be improved.

Optionally, in a design of the second aspect, when the first packet and the second packet are packets in different TCP connections, before the SDP client device sends the second packet to the SDP controller, the method further includes: The SDP client device receives a salt value returned by the SDP controller based on the first packet. The second packet further carries the salt value. The salt value carried in the second packet is used by the SDP controller to determine that the single-packet authentication on the second SDP client device has succeeded. In the foregoing design, if the first packet and the second packet that are sent by the SDP client device are packets in different TCP connections, the salt value sent by the SDP controller based on the first packet is further carried in the second packet, so that the SDP controller can determine, based on the salt value carried in the second packet, that the single-packet authentication on the second SDP client device has succeeded.

Optionally, in a design of the second aspect, the first packet is a synchronous SYN packet.

Optionally, in a design of the second aspect, the device identifier carried in the TCP option field of the first packet is a device identifier in a ciphertext form. The method further includes: obtaining a character string of a specified length based on a device identifier in a plaintext form of the SDP client device; and encrypting the character string by using a sequence number of the SYN packet to obtain the device identifier in the ciphertext form. Optionally, the character string of the specified length is obtained by performing a hash operation on the device identifier in plaintext. In the foregoing design, the device identifier carried in the first packet is encrypted, so that security of the device identifier transmitted over a network can be ensured, thereby avoiding a case in which after intercepting the first packet, an unauthorized SDP client device obtains a device identifier of an authorized SDP client device from the first packet, to perform a malicious activity by masquerading the authorized SDP client device.

Optionally, in a design of the second aspect, after the SDP client device receives the resource list returned by the SDP controller, the method further includes: The SDP client device sends a third packet to an SDP gateway. A TCP option field of the third packet carries a device identifier of the SDP client device. The SDP client device receives service data returned by the application server. The service data is sent by the application server after the SDP gateway forwards the third packet to the application server after determining, based on the device identifier carried in the TCP option field of the third packet, that the SDP client device is authorized. In the foregoing design, the device identifier of the SDP client device is carried in the TCP option field of the third packet, so that the SDP gateway can identify different SDP client devices in a case in which a plurality of SDP client devices use a same source IP address after translation is performed by a same SNAT device, thereby ensuring security of a protected application resource. In addition, the device identifier of the SDP client device is carried in the TCP option field of the third packet but not in another protocol layer above a TCP transport layer, so that there is no need to create a socket, and there is no need to read and parse application layer data, thereby reducing system overheads of the SDP controller.

Optionally, in a design of the second aspect, the third packet is a synchronous SYN packet.

Optionally, in a design of the second aspect, the device identifier carried in the TCP option field of the third packet is a device identifier in a ciphertext form. The method further includes: obtaining a character string of a specified length based on a device identifier in a plaintext form of the SDP client device; and encrypting the character string by using a sequence number of the SYN packet used as the third packet to obtain the device identifier in the ciphertext form. Optionally, the character string of the specified length is obtained by performing a hash operation on the device identifier in plaintext. In the foregoing design, the device identifier carried in the third packet is encrypted, so that security of the device identifier transmitted over a network can be ensured, thereby avoiding a case in which after intercepting the first packet, an unauthorized SDP client device obtains a device identifier of an authorized SDP client device from the third packet, to perform a malicious activity by masquerading the unauthorized SDP client device.

Optionally, in a design of the second aspect, the method further includes: The SDP client device receives token information sent by the SDP controller, and carries the token information in a resource access request sent subsequently, so that the SDP gateway verifies, based on the token information carried in the resource access request, the resource access request initiated by the SDP client device.

According to a third aspect, an access control method is provided. The method includes: An SDP gateway receives client information sent by an SDP controller. The client information indicates that authentication on an SDP client device succeeds. The client information includes a device identifier of the SDP client device. The SDP gateway receives a third packet sent by the SDP client device. A TCP option field of the third packet carries a device identifier of the SDP client device. The SDP gateway determines, based on the device identifier included in the client information and the device identifier included in the third packet, whether the SDP client device is authorized. If it is determined that the SDP client device is authorized, the SDP gateway sends the third packet to the application server, and forwards, to the SDP client device, service data returned by the application server.

In the foregoing technical solution, the SDP client device includes the device identifier of the SDP client device in the TCP option field of the third packet, so that the SDP gateway can identify different SDP client devices in a case in which a plurality of SDP client devices access a resource by using a same source IP address after translation is performed by a same SNAT device, thereby ensuring security of a protected application resource. In addition, the device identifier of the SDP client device is carried in the TCP option field of the third packet but not in another layer above a TCP transport layer, so that there is no need to create a socket, and there is no need to read and parse application layer data, thereby reducing system overheads of the SDP controller or the SDP gateway.

Optionally, in a design of the third aspect, the third packet is a synchronous SYN packet.

Optionally, in a design of the third aspect, the device identifier carried in the TCP option field is a device identifier in a ciphertext form. The method further includes: The SDP gateway decrypts the device identifier in the ciphertext form by using a sequence number of the SYN packet to obtain a first character string of a specified length. The first character string is used by the SDP gateway to determine whether the SDP client device is authorized. In the foregoing design, the device identifier carried in the third packet is encrypted, so that security of the device identifier transmitted over a network can be ensured, thereby avoiding a case in which after intercepting the third packet, an unauthorized SDP client device obtains a device identifier of an authorized SDP client device from the third packet, to perform a malicious activity by masquerading the unauthorized SDP client device.

Optionally, in a design of the third aspect, that the SDP gateway determines, based on the device identifier included in the client information and the device identifier included in the third packet, whether the SDP client device is authorized includes: The SDP gateway obtains a second character string of a specified length based on the device identifier included in the client information. The SDP gateway compares the first character string with the second character string. If the first character string is consistent with the second character string, it is determined that the SDP client device is authorized.

Optionally, in a design of the third aspect, the third packet further carries token information. The token information is used by the SDP gateway to verify resource access initiated by the SDP client device.

According to a fourth aspect, an access control apparatus is provided. The apparatus is used as an SDP controller or a chip built in an SDP controller, and includes a memory and at least one processor. The memory is configured to store instructions. After the instructions are read by the at least one processor, the apparatus performs the access control method according to any one of the first aspect or the designs of the first aspect. For details, refer to the foregoing detailed descriptions. Details are not described herein again.

According to a fifth aspect, an access control apparatus is provided. The apparatus is used as an SDP controller or a chip built in an SDP controller. The apparatus has a function of implementing the access control method according to any one of the first aspect or the designs of the first aspect. The function can be implemented by hardware, or can be implemented by hardware executing corresponding software. The hardware or the software includes one or more modules corresponding to the foregoing function.

According to a sixth aspect, an access control apparatus is provided. The apparatus is used as an SDP client device or a chip built in an SDP client device, and includes a memory and at least one processor. The memory is configured to store instructions. After the instruction are read by at least one processor, the apparatus performs the access control method according to any one of the second aspect or the designs of the second aspect. For details, refer to the foregoing detailed descriptions. Details are not described herein again.

According to a seventh aspect, an access control apparatus is provided. The apparatus is used as an SDP client device or a chip built in an SDP client device. The apparatus has a function of implementing the access control method according to any one of the second aspect or the designs of the second aspect. The function can be implemented by hardware, or can be implemented by hardware executing corresponding software. The hardware or the software includes one or more modules corresponding to the foregoing function.

According to an eighth aspect, an access control apparatus is provided. The apparatus is used as an SDP gateway or a chip built in an SDP gateway, and includes a memory and at least one processor. The memory is configured to store instructions. After the instructions are read by at least one processor, the apparatus performs the access control method according to any one of the third aspect or the designs of the third aspect. For details, refer to the foregoing detailed descriptions. Details are not described herein again.

According to a ninth aspect, an access control apparatus is provided. The apparatus is used as an SDP gateway or a chip built in an SDP gateway. The apparatus has a function of implementing the access control method according to any one of the third aspect or the designs of the third aspect. The function can be implemented by hardware, or can be implemented by hardware executing corresponding software. The hardware or the software includes one or more modules corresponding to the foregoing function.

According to another aspect of this application, an access control system is provided. The system includes an SDP controller, an SDP client device, and an SDP gateway. The SDP controller includes the access control apparatus according to any one of the fourth aspect or the fifth aspect. The SDP client device includes the access control apparatus according to the sixth aspect or the seventh aspect. The SDP gateway includes the access control apparatus according to the eighth aspect or the ninth aspect.

According to still another aspect of this application, a computer-readable storage medium is provided. The computer-readable storage medium includes computer instructions. When the computer instructions are run, the access control method according to any one of the first aspect or the designs of the first aspect is performed.

According to still another aspect of this application, a computer-readable storage medium is provided. The computer-readable storage medium includes computer instructions. When the computer instructions are run, the access control method according to any one of the second aspect or the designs of the second aspect is performed.

According to still another aspect of this application, a computer-readable storage medium is provided. The computer-readable storage medium includes computer instructions. When the computer instructions are run, the access control method according to any one of the third aspect or the designs of the third aspect is performed.

According to still another aspect of this application, a computer program product including instructions is provided. When the computer program product runs on a computer, the computer is enabled to perform the access control method according to any one of the first aspect or the designs of the first aspect.

According to still another aspect of this application, a computer program product including instructions is provided. When the computer program product runs on a computer, the computer is enabled to perform the access control method according to any one of the second aspect or the designs of the second aspect.

According to still another aspect of this application, a computer program product including instructions is provided. When the computer program product runs on a computer, the computer is enabled to perform the access control method according to any one of the third aspect or the designs of the third aspect.

It should be understood that, for beneficial effects of any access control apparatus, communication system, computer-readable storage medium, and computer program product provided above, correspondingly refer to beneficial effects of the method embodiments according to the foregoing corresponding aspects. Details are not described herein again.

DESCRIPTION OF EMBODIMENTS

In this application, "at least one" means one or more, and "a plurality of" means two or more. "And/or" describes an association relationship between associated objects, and represents that three relationships exist. For example, A and/or B represents the following cases: Only A exists, both A and B exist, and only B exists, where A and B may be singular or plural. The character "/" generally represents an "or" relationship between the associated objects. "At least one item (piece) of the following" or a similar expression thereof means any combination of these items, including any combination of singular items (pieces) or plural items (pieces). For example, at least one item (piece) of a, b, or c represents a, b, c, a-b, a-c, b-c, or a-b-c, where a, b, and c may be singular or may be plural. In addition, in embodiments of this application, words such as "first" and "second" do not limit a quantity and an execution order.

Before embodiments of this application are described, a background technology in this application is first described.

Figure 1:
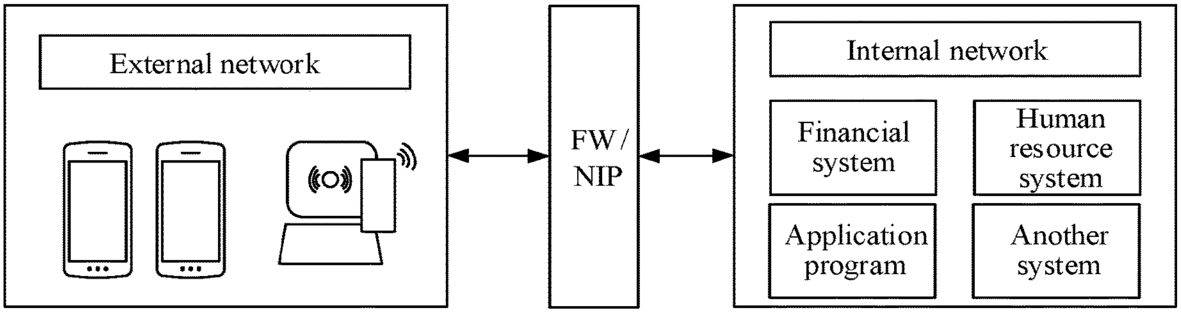
FIG. 1 is an architectural diagram of a conventional network security system according to an embodiment of this application.

A concept of conventional network security is mainly based on a definition of a network border. For example, as shown in FIG. 1, an internal network is isolated from an external network by a border device such as a firewall (FW)/network intelligent protection (NIP). The external network may have a security risk, but the internal network is relatively secure. Resources (for example, a financial system, a human resource system, an application program, and another system used in an enterprise) of the internal network are not exposed to the external network. In other words, a terminal device in the external network cannot access the resources of the internal network. The conventional network security can provide security protection for enterprises. However, with the development of networks, a series of problems occur, such as a blurred network border, complex access, and an internal attack.

To deal with the above problems, a concept of software defined perimeter (SDP) based on a concept of zero trust is proposed. The SDP is a technology for resource access control based on an identity. Based on the SDP technology, identity authentication is first performed on a user and a device used by the user before a terminal device access is granted to resources. If the authentication succeeds, the user can access the resources by using the device. If the authentication fails, the user cannot access the resources by using the device. In other words, in the SDP technology, authentication is strictly performed on an access request of each terminal device, to ensure that the resources are always securely accessed, thereby ensuring resource isolation and security.

Figure 2:
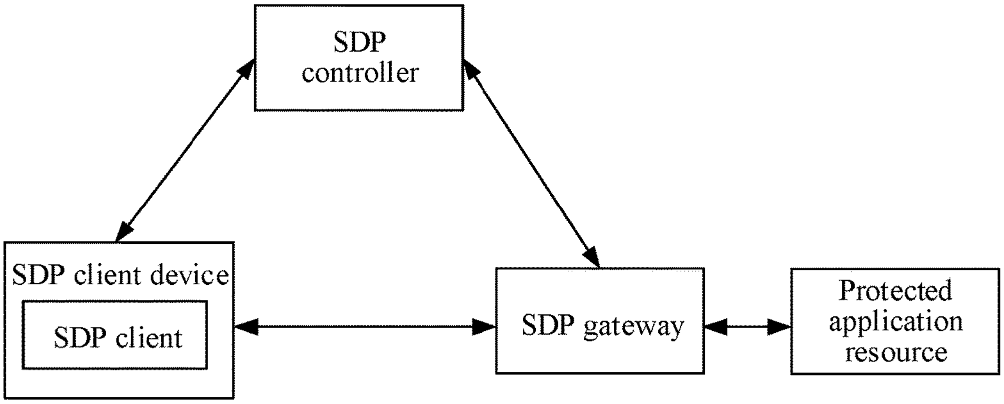
FIG. 2 is a diagram of a structure of a SDP system according to an embodiment of this application.

FIG. 2 is a diagram of a structure of an SDP system according to an embodiment of this application. The SDP system includes an SDP controller, an SDP client, an SDP gateway, and a protected application resource. Both the SDP client and the SDP gateway may be referred to as an SDP host. The SDP host is classified into the SDP client and the SDP gateway according to a connection initiator and a connection receiver. The SDP gateway is provided between the SDP client and the protected application resource. The SDP gateway is needed when the SDP client accesses the protected application resource.

Optionally, the SDP client is installed on a terminal device. The terminal device on which the SDP client is installed is referred to as an SDP client device. Optionally, a local agent corresponding to the SDP client is further installed on the SDP client device. The local agent is configured to perform particular processing on a packet sent or received by the SDP client. For example, in this embodiment of this application, the local agent is configured to add a device identifier of the SDP client device to TCP option fields of a first packet and a third packet in the following method embodiments.

In the SDP system, the SDP controller is configured to perform identity authentication on the SDP client device, perform authentication on access of the SDP client device to the protected application resource, and the like. Optionally, the SDP controller is further configured to deliver a control policy of an authorized SDP client device to the SDP gateway, so that the SDP gateway controls the access of the SDP client device to the protected application resource based on the control policy. Optionally, the protected application resource includes a world wide web (WWW) application, a secure shell protocol (SSH) service, a service based on a client/server (C/S) system, a service based on a browser/server (B/S) system, and the like. This is not limited in embodiments of this application.

The SDP client and the SDP gateway separately establish a bidirectional connection with the SDP controller. When the SDP client needs to access the protected application resource, the SDP client first initiates authentication to the SDP controller. After the authentication succeeds, the SDP controller sends, to the SDP gateway, information such as a source IP address that needs to be allowed and a destination port. The SDP client then sends an access request to the SDP gateway, the SDP gateway determines whether a source IP address of the access request is valid, and forwards the access request to the protected application resource when the source IP address is valid, so that the SDP client sending the access request is allowed to access the protected application resource.

Figure 3:
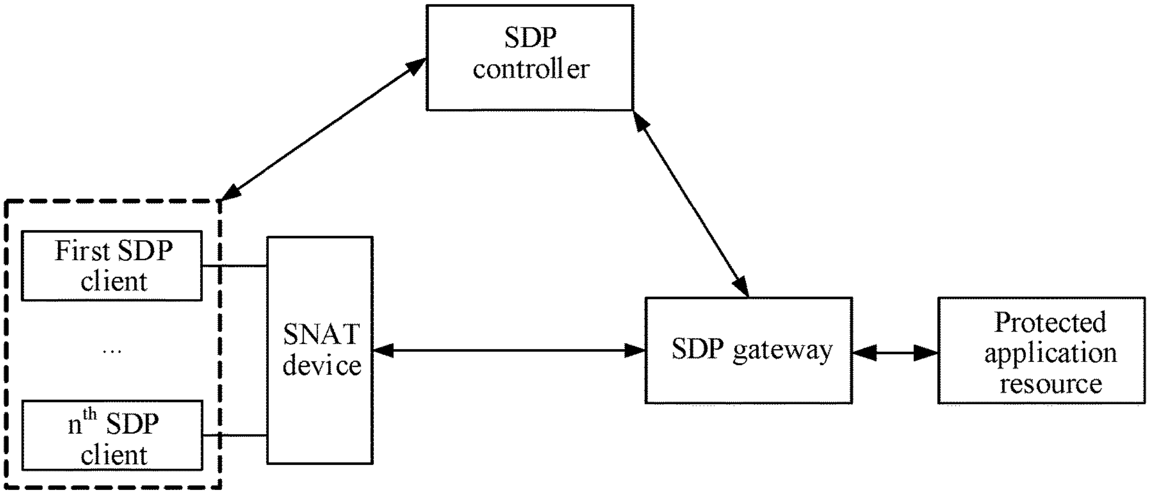
FIG. 3 is a diagram of another structure of a SDP system according to an embodiment of this application.

Currently, in an SDP system, as shown in FIG. 3, when a plurality of SDP clients (represented as a first SDP client to an $n^{th}$ SDP client in FIG. 3) use a same source IP address after translation is performed by an SNAT device to access the protected application resource, source IP addresses of access requests received by an SDP gateway from the plurality of SDP clients are the same, and the SDP gateway cannot distinguish between IP addresses before the translation by the SNAT device. In this case, provided that authentication on one SDP client in the plurality of SDP clients succeeds, the remaining SDP clients that are not authenticated can access the protected application resource by using the source IP address, resulting in some security risks. Based on this, an embodiment of this application provides an access control method, so that different SDP clients can be identified when the plurality of SDP clients use one SNAT device, thereby improving security of the protected application resource.

Figure 4:
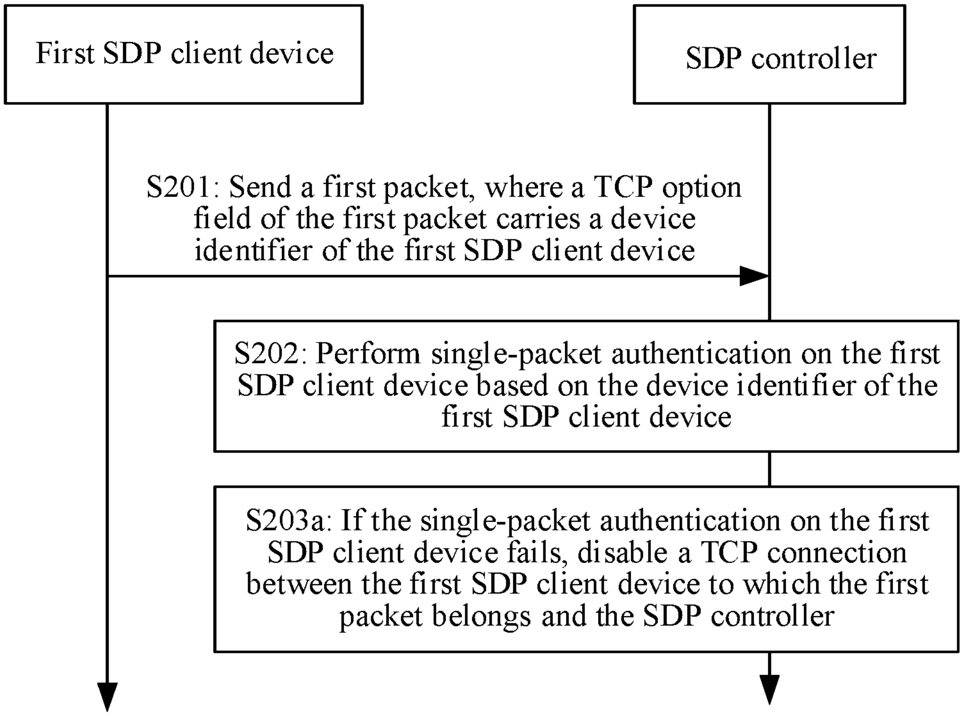
FIG. 4 is a flowchart of an access control method according to an embodiment of this application.

FIG. 4 is a flowchart of an access control method according to an embodiment of this application. The method is applied to a system including an SDP controller, an SDP client device, and an SDP gateway. Refer to FIG. 4. The method includes the following steps. FIG. 4 shows a case in which single-packet authentication performed by the SDP controller on a first SDP client device fails.

S201: The first SDP client device sends a first packet to the SDP controller, where a transmission control protocol (TCP) option field of the first packet carries a device identifier of the first SDP client device.

The SDP client device is a terminal device on which an SDP client is installed. In this embodiment, the "first packet" is used to represent a packet sent by the SDP client device for single packet authorization (SPA) authentication. Optionally, the first packet is a synchronous (SYN) packet when the first SDP client device initiates a TCP connection to the SDP controller.

Figure 5:
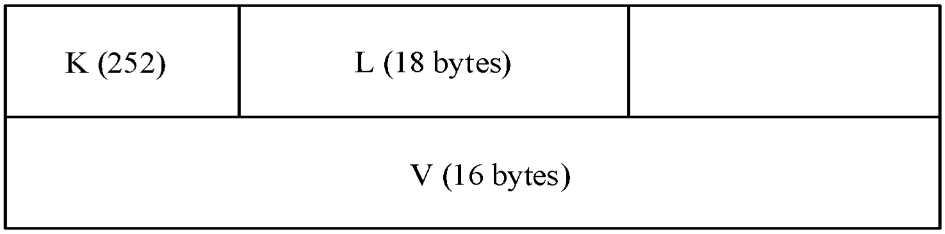
FIG. 5 is a diagram of a TCP option according to an embodiment of this application.

In addition, the first packet is a packet carried at a TCP transport layer. A TCP option field of the first packet carries the device identifier of the first SDP client device. For example, as shown in FIG. 5, the TCP option field includes three portions: a kind (K), a length (L), and a value (V). The kind K represents a kind of information carried in the TCP option field, and different values of K correspond to different kinds. For example, in FIG. 5, a value 252 of K indicates that the information carried in the TCP option field is the device identifier of the SDP client device. The length L represents a length occupied by the TCP option field. In FIG. 5, an example in which the TCP option field occupies 18 bytes is used for description. The value V represents the device identifier of the SDP client device. In FIG. 5, an example in which a length occupied by the value V is 16 bytes is used for description.

In addition, the device identifier of the first SDP client device can uniquely identify the first SDP client device. The device identifier is generated based on related information about the first SDP client device. For example, the first SDP client device uses information such as a primary hard disk sequence number of the first SDP client device, media access control (MAC) information of a network adapter, and/or a central processing unit (CPU) sequence number as primary key information, and then generates the device identifier with reference to a current timestamp and a hash value generated by a random number.

When the first SDP client device establishes the TCP connection to the SDP controller, the first SDP client device sends the first packet to the SDP controller. The TCP option field of the first packet carries the device identifier of the first SDP client device, to initiate the SPA authentication to the SDP controller by using the first packet.

Optionally, the device identifier of the SDP client device carried in the TCP option field of the first packet is a device identifier in a ciphertext form. For example, a structure of the TCP option field is shown in FIG. 5. A device identifier carried in the third portion (that is, V) of the TCP option field is the device identifier in the ciphertext form of the SDP client device.

In a n implementation, the device identifier in the ciphertext form is obtained in the following manner. The first SDP client device obtains a character string of a specified length based on a device identifier in a plaintext form of the first SDP client device, and performs advanced encryption standard (AES) symmetric encryption on the character string by using a sequence number of the SYN packet, to obtain the device identifier in the ciphertext form. Optionally, when obtaining the character string of the specified length, the first SDP client device performs a hash operation on the device identifier in the plaintext form by using a hash algorithm, or selects the device identifier in the plaintext form to obtain the character string of the specified length.

It should be noted that, in addition to the sequence number of the SYN packet, a key used by the first SDP client device to encrypt the character string may be other unique information. In this application, an example in which the key is the sequence number of the SYN packet is merely used for description, and this does not constitute a limitation on this embodiment of this application.

Further, when the TCP option field of the first packet further includes another kind of TCP option, if a length of the TCP option field exceeds a preset length (for example, 40 bytes), the first SDP client device further sifts out and rearranges the TCP option field, to ensure that the length of the TCP option field does not exceed the preset length. After rearranging an original TCP option in the TCP option field, the first SDP client device adds the TCP option used to carry the device identifier of the first SDP client device after a last TCP option. If a corresponding TCP option is not filled with the device identifier of the first SDP client device, the corresponding TCP option can be filled in a manner of filling with an invalid character (for example, NOP).

For example, when the TCP option field further includes a TCP option used to improve forwarding performance of the first packet, the first SDP client device reserves the TCP option used to improve the forwarding performance of the first packet. For example, the TCP option used to improve the forwarding performance of the first packet includes one or more of the following three TCP options: a selective acknowledgment permitted (SACK_PERM) option, a window scale (WINDOW) option, and a maximum segment size (MSS) option.

In an embodiment, S201 may be replaced with the following: The first SDP client device sends a first packet to the SDP controller. A transport layer security (TLS) option of the first packet carries a device identifier of the SDP client device.

A difference between including the device identifier of the first SDP client device in the TLS option field of the first packet and including the device identifier of the first SDP client device in the TCP option field of the first packet lies in: A TLS connection is borne in an application layer. That is, the TLS connection is located over the TCP connection. In this case, adding and obtaining the device identifier in the TLS option need to be implemented by using a socket. However, creating, reading, and parsing data of the application layer causes great system overheads.

It should be noted that, in a manner in which the device identifier of the first SDP client device is carried in the TLS option field of the first packet, when receiving the first packet, the SDP controller can also implement the single-packet authentication on the first SDP client device by using the following steps, so that the SDP controller identifies different SDP client devices when a plurality of SDP client devices use a same source IP address after translation is performed by a same SNAT device, thereby ensuring security of a protected application resource.

The following uses an example in which the TCP option of the first packet carries the device identifier of the first SDP client device for description.

S202: When the SDP controller receives the first packet, the SDP controller performs the single-packet authentication on the first SDP client device based on the device identifier of the first SDP client device.

When the SDP controller receives the first packet, the SDP controller parses the TCP option field of the first packet. If the TCP option field of the first packet does not carry the device identifier of the first SDP client device, the SDP controller determines that the single-packet authentication on the first SDP client device fails. If the TCP option field of the first packet carries the device identifier of the first SDP client device, the SDP controller performs the single-packet authentication on the SDP client device based on the device identifier of the first SDP client device and a source IP address of the first SDP client carried in the first packet. If both the device identifier and the source IP address are authenticated, the single-packet authentication on the first SDP client device succeeds. If at least one of the device identifier and the source IP address fails to be authenticated, the single-packet authentication on the first SDP client device fails.

A process in which the SDP controller performs authentication on the source IP address of the first SDP client is consistent with an authentication process in conventional technologies. Details are not described herein again in this embodiment of this application. The following describes in detail a process in which the SDP controller performs authentication on the device identifier of the first SDP client device.

For example, when the SDP controller obtains the device identifier of the first SDP client device, the SDP controller queries a trusted device identifier list stored locally. The trusted device identifier list includes device identifiers in a plaintext form of the plurality of SDP client devices. Optionally, the device identifiers of the plurality of SDP client devices in the trusted device identifier list are sent to the SDP controller by the plurality of SDP client devices when the plurality of SDP client devices register with the SDP controller. In a case in which the device identifier of the SDP client device carried in the TCP option field of the first packet is a device identifier in a plaintext form, if the device identifier of the SDP client device carried in the TCP option field of the first packet is in the trusted device identifier list, the SDP controller determines that the authentication on the device identifier of the first client device succeeds. If the device identifier of the SDP client device carried in the TCP option field of the first packet is not in the trusted device identifier list, the SDP controller determines that the authentication on the device identifier of the first client device fails.

In an embodiment, in a case in which the device identifier carried in the TCP option field of the first packet is a device identifier in a ciphertext form, the SDP controller parses the TCP option field of the first packet to obtain the device identifier in the ciphertext form. The SDP controller decrypts the device identifier in the ciphertext form by using the sequence number of the first packet (that is, the SYN packet), to obtain a character string of a specified length. Then, the SDP controller performs the authentication on the device identifier of the first SDP client device based on the character string.

For example, when the SDP controller obtains the device identifier of the SDP client device in the first packet, the SDP controller queries a character string list corresponding to the trusted device identifier list stored locally. Optionally, the character string list includes character strings of specified lengths that are respectively obtained by the SDP controller based on the device identifiers in the plaintext form of the plurality of SDP client devices in the trusted device identifier list. A manner of obtaining the character string in the character string list is similar to the description in step S201. Refer to the description in step S201. For example, the SDP controller performs a hash operation on a device identifier in the plaintext form of an SDP client device in the trusted device identifier list to obtain a corresponding character string of a specified length. If the character string of the specified length obtained by the SDP controller from the TCP option field of the first packet is in the character string list, the SDP controller determines that the authentication on the device identifier of the first SDP client device succeeds. If the character string of the specified length obtained from the TCP option field of the first packet is not in the character string list, the SDP controller determines that the authentication on the device identifier of the first client device fails.

Further, for the first SDP client device, that the SDP controller obtains a device identifier of the first SDP client device in a registration process includes: The first SDP client device sends registration information to the SDP controller. The registration information includes user information and the device identifier of the first SDP client device. The SDP controller receives the registration information, adds the device identifier of the first SDP client device to the trusted device identifier list after the device identifier of the first SDP client device is approved, and adds the user information to the trusted user information list after the user information is approved.

Optionally, the registration information further includes information such as a user level and an access permission. For example, the registration information further includes a working domain of a user. The SDP controller further associates, with the user based on the working domain, at least one application server that is in a protected resource and that is allowed to be accessed by the user, to form a resource list of the user.

S203*a*: If the single-packet authentication on the first SDP client device fails, the SDP controller disables the TCP connection between the first SDP client device to which the first packet belongs and the SDP controller.

The SDP controller disables the TCP connection between the first SDP client device to which the first packet belongs and the SDP controller, or the SDP controller blocks the TCP connection between the first SDP client device to which the first packet belongs and the SDP controller.

Optionally, if the single-packet authentication performed by the SDP controller on the first SDP client device fails, the SDP controller further sends a single-packet authentication response to the first SDP client device. The single-packet authentication response indicates that the single-packet authentication on the first SDP client device fails.

In this embodiment of this application, when the first SDP client device initiates single-packet authentication to the SDP controller, the first SDP client sends the first packet to the SDP controller. The TCP option field of the first packet carries the device identifier of the first SDP client device. When the SDP controller receives the first packet, the SDP controller performs the single-packet authentication on the first SDP client device based on the device identifier of the SDP client device carried in the TCP option field of the first packet. If the single-packet authentication on the first SDP client device fails, the SDP controller disables the TCP connection between the SDP client device to which the first packet belongs and the SDP controller. In this way, when the plurality of SDP client devices use a same source IP address after translation is performed by a same SNAT device, the SDP controller can identify different SDP client devices, so that security of a protected application resource can be ensured.

The foregoing FIG. 4 shows a case in which the single-packet authentication performed by the SDP controller on the first SDP client device fails. The following shows, by using FIG. 6, a case in which single-packet authentication performed by the SDP controller on a second SDP client device succeeds. The second SDP client device can initiate the single-packet authentication to the SDP controller in a manner the same as that in S201. The SDP controller can also perform the single-packet authentication on the second SDP client device in a manner the same as that in S202. Details are not described herein again in this embodiment of this application.

Figure 6:
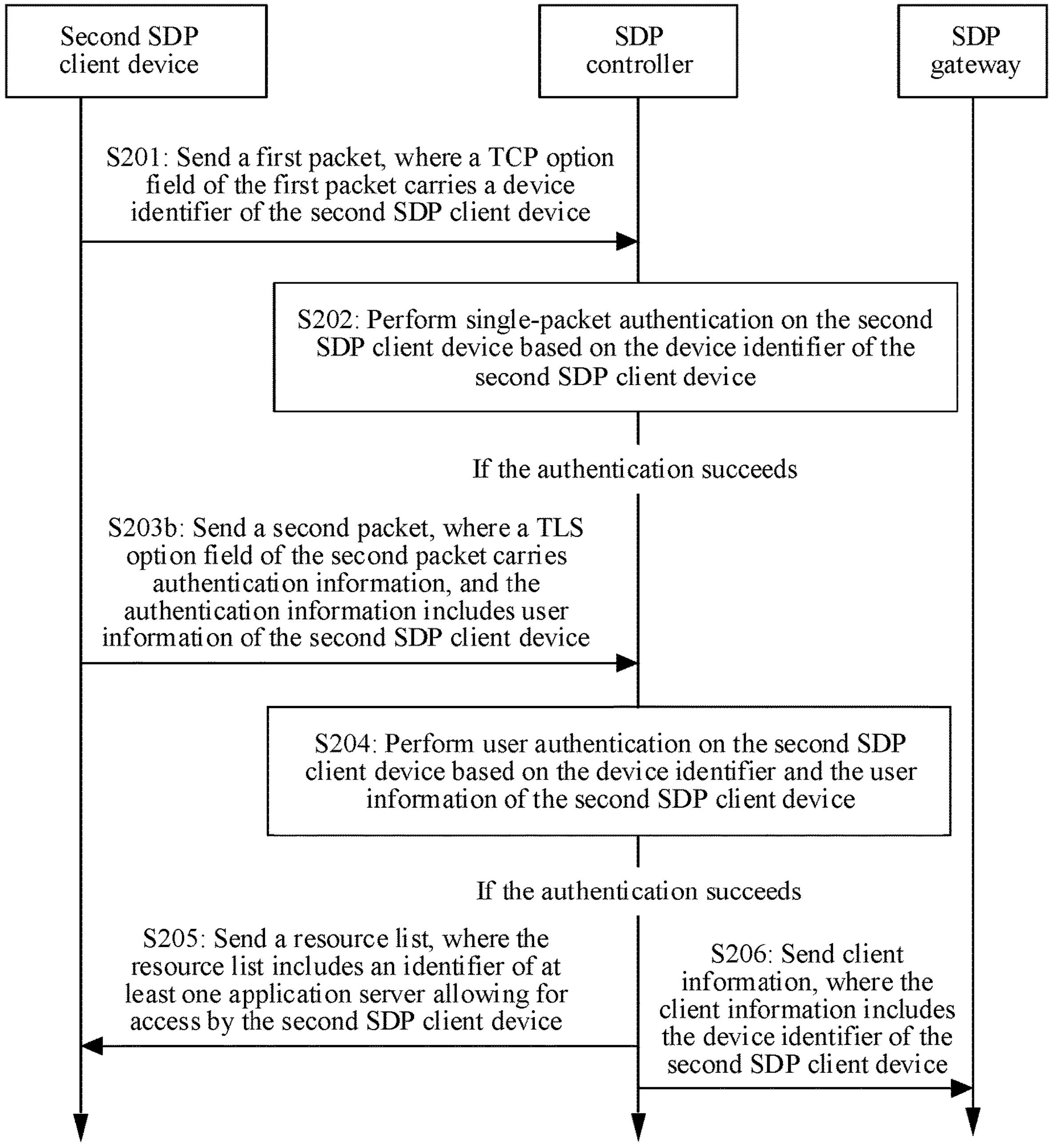
FIG. 6 is a flowchart of another access control method according to an embodiment of this application.

Further, as shown in FIG. 6, if the single-packet authentication performed by the SDP controller on the second SDP client device succeeds, the method further includes S203*b* to S206.

S203*b*: The second SDP client device sends a second packet to the SDP controller, where a TLS option field or an application layer packet header of the second packet carries authentication information, and the authentication information includes user information of the second SDP client device.

The user information of the second SDP client device includes information about a user logging in to the second SDP client device. Optionally, the user information includes a user name and a password. The user name is set by the user when the user registers with the SDP controller, or is assigned by the SDP controller to the user when the user registers with the SDP controller.

In addition, in this embodiment, the "second packet" is used to represent a packet sent by the SDP client device to the SDP controller for user authentication. The second packet is a packet carried at a TLS application layer. The TLS option field or the application layer packet header of the second packet carries the authentication information of the second SDP client device. A structure of the TLS option field is similar to the structure of the TCP option field of the first packet. For detailed descriptions, refer to related descriptions of the TCP option field. This is not limited in embodiments of this application. The following uses an example in which the TLS option field of the second packet carries the authentication information for description.

If the single-packet authentication performed by the SDP controller on the second SDP client device succeeds, the second SDP client device sends the second packet to the SDP controller. The TLS option field or the application layer packet header of the second packet carries the authentication information of the second SDP client device, to initiate the user authentication to the SDP controller by using the second packet.

Optionally, after the SDP controller performs the single-packet authentication on the second SDP client device, if the single-packet authentication on the second SDP client device succeeds, the SDP controller sends a single-packet authentication response to the second SDP client device. The single-packet authentication response indicates that the single-packet authentication on the second SDP client device succeeds. When the second SDP client device receives the single-packet authentication response, the second SDP client device sends the second packet to the SDP controller.

Figure 7:
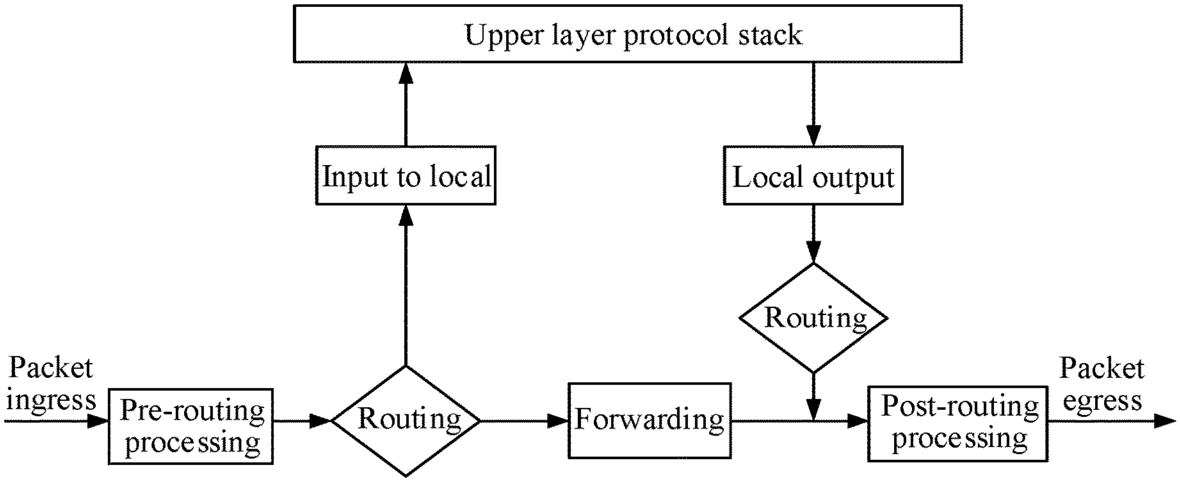
FIG. 7 is a diagram of reporting a second packet according to an embodiment of this application.

In an example, as shown in FIG. 7, the second SDP client device generates the second packet in the following manner: A local agent in the second SDP client device obtains a current application packet from an upper layer protocol stack by using a hook function added to a subsystem such as NetFilter, and adds the authentication information of the second SDP client device to the application packet. FIG. 7 further shows a related NetFilter hook function attaching point and routing, for example, input to local (LOCAL_IN), local output (LOCAL_OUT), pre-routing processing (PRE ROUTING), direct forwarding (FORWARD), and post-routing processing (POST ROUTING). For example, the second SDP client device adds the authentication information to a TLS option field of the application packet, to generate the second packet. Alternatively, the authentication information carried in the second packet is carried in a hypertext transfer protocol secure (HTTPS) layer, for example, carried in an HTTPS tunnel encapsulated packet header. For example, when the protected resource is a service of a B/S system, the authentication information is carried in the HTTPS layer. When the protected resource is a service of a C/S system, the authentication information is carried in the TLS option field.

S204: When the SDP controller receives the second packet, the SDP controller performs the user authentication on the second SDP client device based on a device identifier of the second SDP client device and the user information.

When the SDP controller receives the second packet, the SDP controller parses the TLS option field of the second packet to obtain the user information. Then, the SDP controller performs the user authentication on the second SDP client device based on the user information and the device identifier of the second SDP client device. Optionally, a device identifier used during the user authentication may be the device identifier carried in the TCP option field of the first packet. Alternatively, the second packet further carries the device identifier. For example, the SDP controller separately compares the device identifier and the user information of the second SDP client device with a device identifier and user information during the registration of the second SDP client device. If the device identifier carried in the first packet and the user information carried in the second packet are consistent with the device identifier and the user information during the registration, the SDP controller determines that the user authentication on the second SDP client device succeeds. If the device identifier carried in the first packet and the user information carried in the second packet are inconsistent with the device identifier and the user information during the registration, the SDP controller determines that the user authentication on the second SDP client device fails.

It should be noted that a process in which the SDP controller performs authentication on the device identifier carried in the first packet and the device identifier during the registration is the same as the foregoing process of the single-packet authentication. For details, refer to the foregoing related descriptions. Details are not described herein again in this embodiment of this application. In addition, for a process in which the SDP controller performs authentication on the user information carried in the second packet and the user information during the registration, refer to descriptions in related technologies. Details are not described in this embodiment of this application.

In an embodiment, the first packet and the second packet that are sent by the second SDP client device are packets in a same TCP connection. For example, it is assumed that the first packet and the second packet are packets in a first TCP connection, the first packet is an SYN packet, and the second packet is an application packet. In a process of establishing the first TCP connection, the second SDP client device sends the SYN packet to the SDP controller. A TCP option field of the SYN packet carries a device identifier of the SDP client device. The SDP controller returns a synchronous acknowledgment (SYN+ACK) packet to the second SDP client device. The second SDP client device sends the SYN+ACK packet to the SDP controller, and the first TCP connection is successfully established. The second SDP client device sends the application packet to the SDP controller by using the first TCP connection. A TLS option field of the application packet carries the authentication information.

In an embodiment, the first packet and the second packet that are sent by the second SDP client device are packets in different TCP connections. For example, it is assumed that the first packet is an SYN packet in a first TCP connection, and the second packet is an application packet in a second TCP connection. In a process of establishing the first TCP connection, the second SDP client device sends the SYN packet to the SDP controller. A TCP option field of the SYN packet carries a device identifier of the second SDP client device. The SDP controller returns a synchronous acknowledgment (SYN+ACK) packet to the second SDP client device. The second SDP client device sends the SYN+ACK packet to the SDP controller. After the second TCP is established, the second SDP client device sends the application packet to the SDP controller. A TLS option field of the application packet carries the authentication information.

Optionally, if the first packet and the second packet that are sent by the second SDP client device are packets in different TCP connections, the second packet sent by the second SDP client device to the SDP controller further carries a salt value. The salt value may be used to associate the TCP connection to which the first packet belongs with the TCP connection to which the second packet belongs. The salt value is sent by the SDP controller to the second SDP client device after the single-packet authentication on the second SDP client device succeeds. For example, before the second SDP client device sends the second packet to the SDP controller, the method further includes: The SDP controller sends the salt value to the second SDP client device based on the first packet sent by the second SDP client device. In this way, when the second SDP client device receives the salt value, the second SDP client device includes the salt value in the second packet and sends the second packet to the SDP controller. In this case, when the SDP controller receives the second packet, the SDP controller can determine, based on the salt value carried in the second packet, that the single-packet authentication on the second SDP client device has succeeded. Then, the SDP controller performs the user authentication on the second SDP client device according to S204.

Further, if the user authentication performed by the SDP controller on the second SDP client device fails: if the first packet and the second packet are packets in a same TCP connection, the SDP controller disables a TCP connection between the second SDP client device to which the first packet belongs and the SDP controller; if the first packet and the second packet are packets in different TCP connections, the SDP controller disables a TCP connection between the second SDP client device to which the first packet and the second packet belong and the SDP controller. If the user authentication performed by the SDP controller on the second SDP client device succeeds, the SDP controller performs the following S205 and S206. FIG. 6 further shows a case in which the user authentication performed by the SDP controller on the second SDP client device succeeds.

S205: The SDP controller sends a resource list to the second SDP client device, where the resource list includes an identifier of at least one application server allowing for access by the second SDP client device.

The at least one application server allowing for access by the second SDP client device is a protected resource. The protected resource further includes another resource except the at least one application server. An identifier of each of the at least one application server may uniquely identify the application server. Optionally, the identifier of each of the at least one application server includes a port and an IP address of the application server.

In addition, the at least one application server allowing for access by the second SDP client device is allocated by the SDP controller to the second SDP client device based on the user information of the second SDP client device. For example, the user information may indicate information such as a user level and an access permission. The SDP controller allocates, to the second SDP client device based on the information such as the user level and the access permission, an application server allowing for access by the second SDP client device.

If the user authentication performed by the SDP controller on the second SDP client device succeeds, the SDP controller obtains the identifier of the at least one application server based on the user information, that is, obtains the resource list, and sends the resource list to the second SDP client device. In this way, the second SDP client device can receive the resource list and initiate resource access to the SDP gateway based on the resource list.

Optionally, the SDP controller further sends token information to the second SDP client device. For example, the SDP controller can send the token information to the second SDP client device in a set-cookie manner. Subsequently, the second SDP client device carries the token information when accessing the at least one application server. The token information may be used for access verification. The token information includes one or more tokens. Optionally, the one or more tokens include a user token (user_token), a device token (device_token), an application token (app_token), and the like.

S206: The SDP controller sends client information to the SDP gateway, where the client information indicates that authentication on the second SDP client device succeeds, and the client information includes the device identifier of the second SDP client device.

If the user authentication performed by the SDP controller on the second SDP client device, the SDP controller sends the client information of the second SDP client device to the SDP gateway. In this way, the SDP gateway can receive the client information. Subsequently, when the second SDP client device initiates the resource access to the SDP gateway, the SDP gateway can perform valid verification on the access to the second SDP client device based on the device identifier in the client information.

In an embodiment, the SDP controller sends a northbound packet to the SDP gateway. The northbound packet carries the client information. The northbound packet refers to a control packet delivered by using a northbound protocol such as RESTful or Netconf. Optionally, the SDP controller can further send, to the SDP gateway, a source IP address and a destination port that need to be allowed, that is, send, to the SDP gateway, a source IP address of the second SDP client device and a port of the at least one application server allowing for access by the second SDP client device. The source IP address and the destination port can be carried in the northbound packet.

Figure 8:
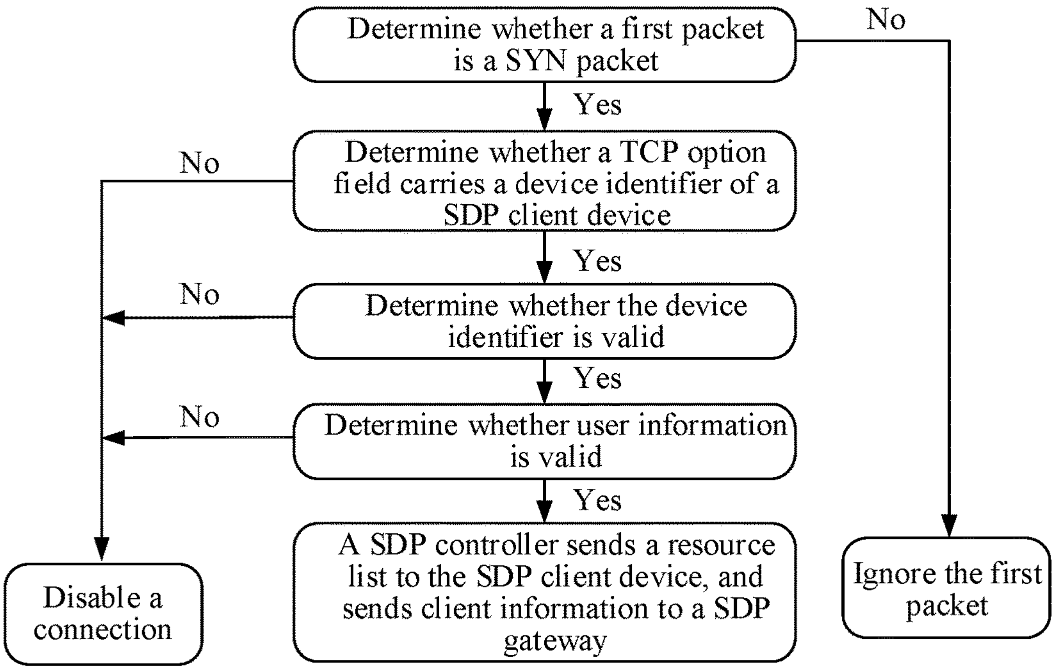
FIG. 8 is a flowchart of still another access control method according to an embodiment of this application.

In the foregoing process, when the SDP controller receives the first packet sent by the second SDP client device, the SDP controller can perform authentication the second SDP client device according to a procedure shown in FIG. 8. For example, when the SDP controller receives the first packet, an authentication process includes: The SDP controller determines whether the first packet is an SYN packet. If the first packet is not an SYN packet, the SDP controller ignores the first packet. If the first packet is an SYN packet, the SDP controller determines whether the TCP option field of the first packet carries the device identifier of the second SDP client device. If the TCP option field of the first packet does not carry the device identifier, the SDP controller disables the connection between the second SDP client device to which the first packet belongs and the SDP controller. If the TCP option field of the first packet carries the device identifier, the SDP controller determines whether the device identifier is valid. If the device identifier is invalid, the SDP controller disables the connection between the second SDP client device to which the first packet belongs and the SDP controller. If the device identifier is valid, the SDP controller determines whether the user information in the second packet sent by the second SDP client device is valid. If the user information in the second packet is invalid, the SDP controller disables the connection between the second SDP client device to which the first packet belongs and the SDP controller. If the user information in the second packet is valid, the SDP controller sends the resource list to the second SDP client device, and sends the client information to the SDP gateway.

The foregoing FIG. 6 to FIG. 8 show a case in which after the single-packet authentication performed by the SDP controller on the second SDP client device succeeds, the second SDP client device sends the second packet for the user authentication to the SDP controller. In addition, after the user authentication performed by the SDP controller on the second SDP client device succeeds, the SDP controller sends the resource list to the second SDP client device and sends the client information to the SDP gateway.

Figure 9:
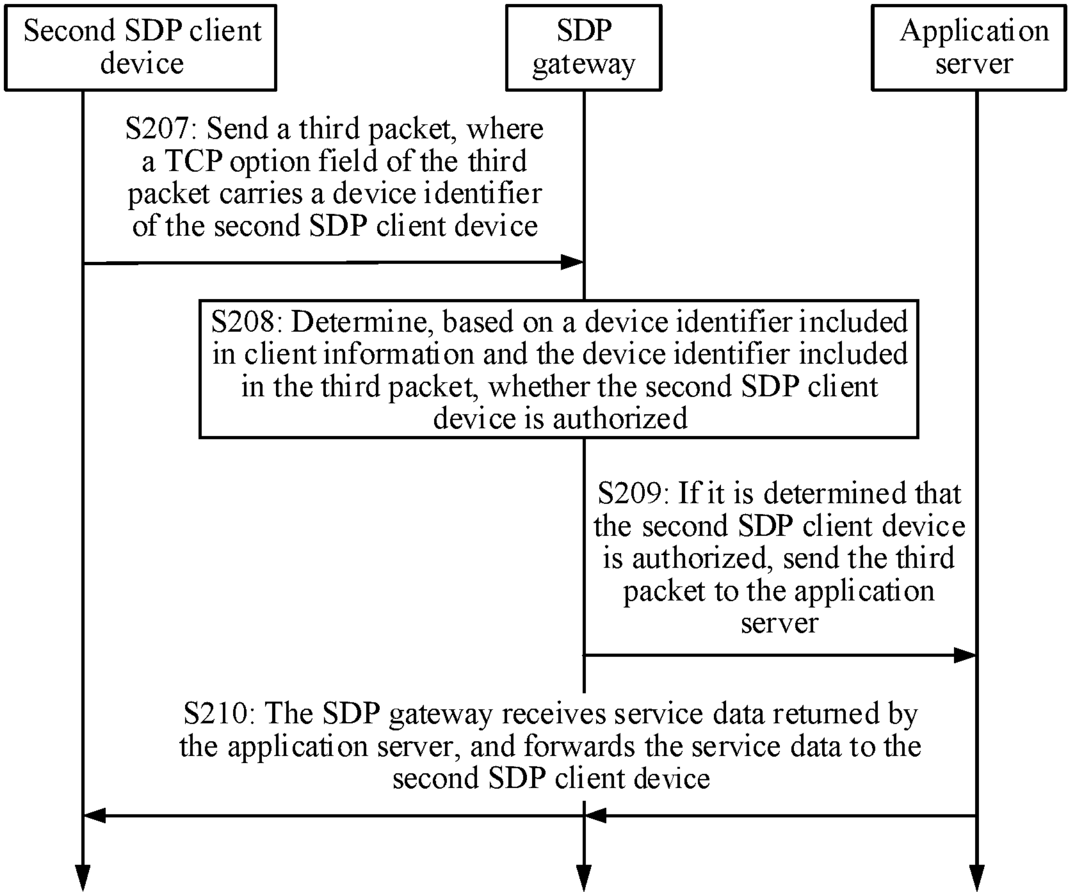
FIG. 9 is a diagram of access control of an SDP controller according to an embodiment of this application.

The following uses FIG. 9 to describe a case in which the second SDP client device initiates the resource access to the SDP gateway after the second SDP client device receives the resource list and the SDP gateway receives the client information, and the SDP gateway returns service data after verifying the access by the second SDP client device and the verification succeeds. As shown in FIG. 9, the method further includes S207 to S210. S201 to S206 are not shown in FIG. 9.

S207: The second SDP client device sends a third packet to the SDP gateway, where a TCP option field of the third packet carries a device identifier of the second SDP client device.

In this embodiment of this application, the "third packet" is used to represent a packet sent by the second SDP client device to the SDP gateway for resource access. Optionally, the third packet is a synchronous (SYN) packet when the second SDP client device initiates a TCP connection to the SDP gateway.

In addition, a manner of carrying the device identifier of the second SDP client device in the TCP option field of the third packet is similar to the manner of carrying the device identifier of the SDP client device in the TCP option field of the first packet described in S201. For details, refer to related descriptions in S201. Details are not described herein again in this embodiment of this application.

Optionally, the device identifier of the SDP client device carried in the TCP option field of the third packet is a device identifier in a ciphertext form. The device identifier in the ciphertext form is obtained in the following manner: The second SDP client device obtains a character string of a specified length based on a device identifier in a plaintext form of the second SDP client device, and performs AES symmetric encryption on the character string by using a sequence number of the SYN packet when the second SDP client device initiates the TCP connection to the SDP gateway, to obtain the device identifier in the ciphertext form.

When the second SDP client device receives the resource list sent by the SDP controller, the second SDP client device sends the third packet to the SDP gateway based on the resource list. The third packet may be used to request to access an application server in the at least one application server. The TCP option field of the third packet carries the device identifier of the second SDP client device.

Optionally, the third packet further carries token information. The token information is used by the SDP gateway to verify the resource access initiated by the second SDP client device. For example, the token information includes a user token, a device token, and an application token. The user token may be used by the SDP gateway to verify user information of the second SDP client device. The device token may be used by the SDP gateway to verify the second SDP client device. The application token may be used by the SDP gateway to verify the application server accessed by the second SDP client device.

In an embodiment, S207 can be replaced with the following: The second SDP client device sends a third packet to the SDP gateway. A TLS option field of the third packet carries a device identifier of the second SDP client device. A difference between including, by the second SDP client device, the device identifier of the second SDP client device in the TLS option field of the third packet and including the device identifier of the second SDP client device in the TCP option field of the third packet is consistent with related descriptions of the first packet in S201. Details are not described herein again in this embodiment of this application.

S208: When the SDP gateway receives the third packet, the SDP gateway determines, based on the device identifier included in the client information and the device identifier included in the third packet, whether the second SDP client device is authorized.

When the SDP gateway receives the client information sent by the SDP controller, the SDP gateway parses the client information to obtain the device identifier included in the client information. When the SDP gateway receives the third packet, the SDP gateway parses the TCP option field of the third packet to obtain the device identifier included in the third packet. Then, the SDP gateway determines, based on the device identifier included in the client information and the device identifier included in the third packet, whether the second SDP client device is authorized. If the device identifier included in the client information is consistent with the device identifier included in the third packet, it is determined that the second SDP client device is authorized. If the device identifier included in the client information is inconsistent with the device identifier included in the third packet, it is determined that the second SDP client device is unauthorized.

Optionally, if the device identifier of the SDP client device carried in the TCP option field of the third packet is a device identifier in a ciphertext form, the SDP gateway further performs the following step: decrypting the device identifier in the ciphertext form by using a sequence number of the third packet to obtain a first character string of a specified length. The first character string is used by the SDP gateway to determine whether the second SDP client device is authorized.

In an example, that the SDP gateway determines, based on the device identifier included in the client information and the device identifier included in the third packet, whether the second SDP client device is authorized includes: The SDP gateway obtains a second character string of a specified length based on the device identifier included in the client information. For example, the SDP gateway obtains a second character string of a specified length by performing a hash operation on the device identifier included in the client information. The SDP gateway compares the first character string with the second character string. If the first character string is consistent with the second character string, it is determined that the second SDP client device is authorized. If the first character string is inconsistent with the second character string, it is determined that the second SDP client device is unauthorized.

Optionally, the third packet further carries a source IP address of the second SDP client device. The client information further includes a source IP address of the second SDP client device. When the source IP address in the client information is consistent with the source IP address in the third packet, the SDP gateway can further determine that the source IP address of the second SDP client device is authorized.

In an embodiment, the third packet further carries token information. The token information is used by the SDP gateway to verify the resource access initiated by the second SDP client device. Correspondingly, when the SDP gateway receives the third packet, the SDP gateway can further send the token information to the SDP controller, to request the SDP controller to verify the token information. When the SDP gateway receives token verification success information sent by the SDP controller, the SDP gateway determines that the resource access initiated by the second SDP client device is authorized.

S209: If it is determined that the second SDP client device is authorized, the SDP gateway sends the third packet to an application server.

The application server is an application server that the second SDP client device requests to access. The application server belongs to the at least one application server allowing for access by the second SDP client device.

In an example, the third packet further carries a port of the application server. When the SDP gateway determines that the second SDP client device is authorized, the SDP gateway sends the third packet to the application server based on the port of the application server.

S210: The SDP gateway receives service data returned by the application server, and forwards the service data to the second SDP client device.

When the SDP gateway sends the third packet to the application server, and the application server receives the third packet, the application server can return corresponding service data to the SDP gateway based on the third packet. When the SDP gateway receives the service data returned by the application server, the SDP gateway forwards the service data to the second SDP client device. In this way, the second SDP client device can receive the service data, so that the access by the second SDP client device to the application server can be implemented.

In this embodiment of this application, the second SDP client device sends the third packet to the SDP gateway. The TCP option field of the third packet carries the device identifier of the second SDP client device. When the SDP gateway receives the third packet, the SDP gateway can perform valid authentication on the second SDP client device based on the device identifier carried in the third packet and the device identifier in the client information delivered by the SDP controller. If it is determined that the second SDP client device is authorized, the SDP gateway forwards the third packet to the application server, and forwards, to the second SDP client device, the service data returned by the application server. In this way, when the plurality of SDP client devices use a same source IP address after translation is performed by a same SNAT device, the SDP gateway can identify different SDP client devices, so that security of a protected application resource can be ensured.

The foregoing mainly describes, from a perspective of interaction between devices, the solutions provided in embodiments of this application. It may be understood that, to implement the foregoing functions, the SDP controller, the SDP client device, the SDP gateway, and the like include corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, function module division may be performed on the SDP controller, the SDP client device, and the SDP gateway based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 10:
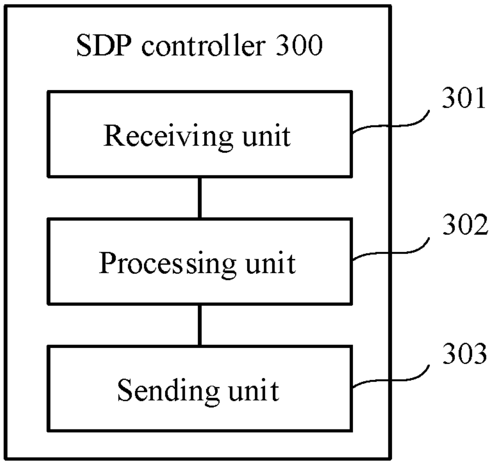
FIG. 10 is a diagram of a structure of an SDP controller according to an embodiment of this application.

When an integrated unit is used, FIG. 10 is a diagram of a structure of an access control apparatus 300 according to an embodiment of this application. The apparatus 300 may be used as an SDP controller or a chip built in an SDP controller. The apparatus 300 includes a receiving unit 301, a processing unit 302, and a sending unit 303. The SDP controller having the structure shown in FIG. 10 can implement functions of the SDP controller in the solutions described in the foregoing method embodiments.

In an embodiment, the receiving unit 301 is configured to receive a first packet sent by a first SDP client device. A transmission control protocol TCP option field of the first packet carries a device identifier of the first SDP client device. The processing unit 302 is configured to perform single-packet authentication on the first SDP client device based on the device identifier of the first SDP client device, and if the single-packet authentication on the first SDP client device fails, disable a TCP connection between the first SDP client device to which the first packet belongs and the SDP controller.

In an embodiment, the receiving unit 301 is further configured to receive a first packet sent by a second SDP client device. A TCP option field of the first packet sent by the second SDP client device carries a device identifier of the second SDP client device. The processing unit 302 is further configured to perform single-packet authentication on the second SDP client device based on the device identifier of the second SDP client device. The receiving unit 301 is further configured to: if the single-packet authentication on the second SDP client device succeeds, receive a second packet sent by the second SDP client device. A transport layer security (TLS) option field or an application layer of the second packet carries authentication information. The authentication information includes user information of the second SDP client device. The processing unit 302 is further configured to perform user authentication on the second SDP client device based on the device identifier and the user information of the second SDP client device. The sending unit 303 is configured to: if the user authentication on the second SDP client device succeeds, send a resource list to the second SDP client device. The resource list includes an identifier of at least one application server allowing for access by the second SDP client device.

Optionally, the first packet and the second packet that are sent by the second SDP client device are packets in a same TCP connection; or the first packet and the second packet that are sent by the second SDP client device are packets in different TCP connections.

Further, if the first packet and the second packet that are sent by the second SDP client device are packets in different TCP connections, the sending unit 303 is further configured to send a salt value to the second SDP client device based on the first packet sent by the second SDP client device. Correspondingly, the second packet further carries the salt value. The processing unit 302 is further configured to determine, based on the salt value carried in the second packet, that the single-packet authentication on the second SDP client device has succeeded.

Optionally, the first packet sent by the first SDP client device is an SYN packet. Further, the device identifier carried in the first packet sent by the first SDP client device is a device identifier in a ciphertext form. The processing unit 302 is further configured to decrypt the device identifier in the ciphertext form by using a sequence number of the SYN packet to obtain a character string of a specified length. The character string is used by the SDP controller to perform single-packet authentication on the first SDP client device. Similarly, the first packet sent by the second SDP client device also meets the foregoing description.

Further, if the user authentication on the second SDP client device succeeds, the sending unit 303 is further configured to send client information to an SDP gateway. The client information indicates that authentication on the second SDP client device succeeds. The client information includes a device identifier of the second SDP client device.

It should be noted that all related content of steps in the foregoing method embodiments may be cited in function descriptions of corresponding functional modules. Details are not described herein again.

Based on hardware implementation, the processing unit 302 in this embodiment of this application may be a processor of the apparatus 300, the sending unit 303 may be a transmitter of the apparatus 300, and the receiving unit 301 may be a receiver of the apparatus 300. The transmitter and the receiver may be integrated together to serve as a transceiver. The transceiver may also be referred to as a communication interface or an interface circuit.

Figure 11:
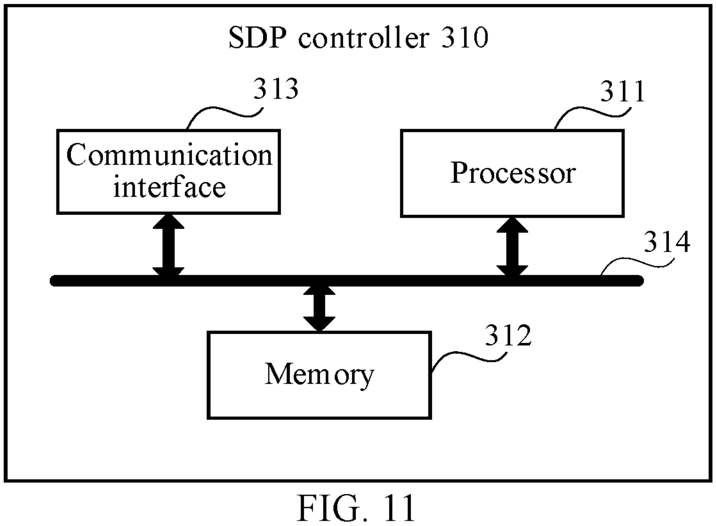
FIG. 11 is a diagram of another structure of an SDP controller according to an embodiment of this application.

FIG. 11 is a diagram of another structure of the access control apparatus 310 in the foregoing embodiment according to an embodiment of this application. The apparatus 310 may be used as an SDP controller or a chip built in an SDP controller. The apparatus 310 includes a processor 311, and may further include a memory 312, a communication interface 313, and a bus 314. The processor 311, the memory 312, and the communication interface 313 are connected by using the bus 314.

The processor 311 is configured to control and manage an action of the apparatus 310. In an embodiment, the processor 311 may be configured to support the apparatus 310 in performing one or more steps in S202, S203*a*, S204, and S208 in the foregoing method embodiments, and/or another technical process described in this specification. The communication interface 313 is configured to support the apparatus 310 in communicating, for example, support the apparatus 310 in communicating with an SDP client device and an SDP gateway.

In this embodiment of this application, the processor 311 may be a central processing unit, a general-purpose processor, a digital signal processor, an application-specific integrated circuit, a field programmable gate array or another programmable logic device, a transistor logic device, a hardware component, or any combination thereof. The processor 311 may implement or perform various example logical blocks, modules, and circuits described with reference to content disclosed in this application. Alternatively, the processor 311 may be a combination of processors implementing a computing function, for example, a combination of one or more microprocessors, or a combination of a digital signal processor and a microprocessor. The bus 314 in FIG. 11 may be a peripheral component interconnect (PCI) bus, an extended industry standard architecture (EISA) bus, or the like. The bus may include an address bus, a data bus, a control bus, and the like. For ease of representation, only one bold line is used to represent the bus in FIG. 11, but this does not mean that there is only one bus or only one type of bus.

Figure 12:
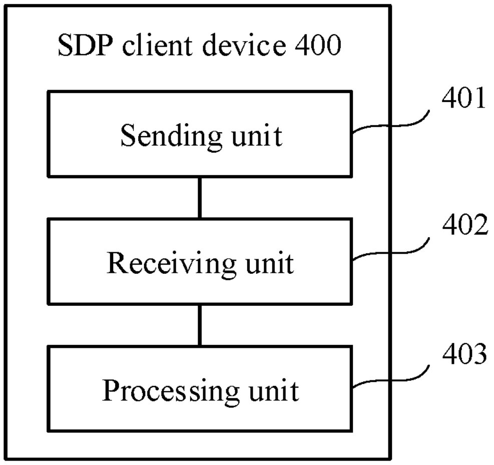
FIG. 12 is a diagram of a structure of an SDP client device according to an embodiment of this application.

When an integrated unit is used, FIG. 12 is a diagram of a structure of an access control apparatus 400 according to an embodiment of this application. The apparatus 400 may be used as an SDP client device or a chip built in an SDP client device. The apparatus 400 includes a sending unit 401, a receiving unit 402, and a processing unit 403. The SDP client device having the structure shown in FIG. 12 can implement functions of the SDP client device in the solutions described in the foregoing method embodiments.

In an embodiment, the sending unit 401 is configured to send a first packet to an SDP controller. A transmission control protocol TCP option field of the first packet carries a device identifier of the SDP client device. If single-packet authentication performed by the SDP controller on the SDP client device fails, the SDP controller disables a TCP connection corresponding to the first packet.

In an embodiment, if the single-packet authentication performed by the SDP controller on the SDP client device succeeds, the sending unit 401 is further configured to send a second packet to the SDP controller. A transport layer security TLS option field or an application layer of the second packet carries authentication information. The authentication information includes user information of the SDP client device. The receiving unit 402 is further configured to receive a resource list returned by the SDP controller. The resource list includes an identifier of at least one application server allowing for access by the SDP client device.

Optionally, the first packet and the second packet are packets in a same TCP connection; or the first packet and the second packet are packets in different TCP connections. Further, when the first packet and the second packet are packets in different TCP connections, the receiving unit 402 is further configured to receive a salt value returned by the SDP controller based on the first packet. Correspondingly, the second packet further carries the salt value. The salt value carried in the second packet is used by the SDP controller to determine that the single-packet authentication on the second SDP client device has succeeded.

Optionally, the first packet is a synchronous SYN packet. Further, the device identifier carried in the TCP option field is a device identifier in a ciphertext form. The processing unit 403 is configured to obtain a character string of a specified length based on a device identifier in a plaintext form of the SDP client device, and encrypt the character string by using a sequence number of the SYN packet to obtain the device identifier in the ciphertext form. In an embodiment, the character string of the specified length is obtained by performing a hash operation on the device identifier in plaintext.

Further, the sending unit 401 is further configured to send a third packet to an SDP gateway. A TCP option field of the third packet carries a device identifier of the SDP client device. The receiving unit 402 is configured to receive service data returned by the application server. The service data is sent by the application server after the SDP gateway forwards the third packet to the application server after determining, based on the device identifier carried in the TCP option field of the third packet, that the SDP client device is authorized.

Optionally, the third packet is an SYN packet. The device identifier carried in the TCP option field of the third packet is a device identifier in a ciphertext form.

It should be noted that all related content of steps in the foregoing method embodiments may be cited in function descriptions of corresponding functional modules. Details are not described herein again.

Based on hardware implementation, the processing unit 403 in this embodiment of this application may be a processor of the apparatus 400, the sending unit 401 may be a transmitter of the apparatus 400, and the receiving unit 402 may be a receiver of the apparatus 400. The transmitter and the receiver may be integrated together to serve as a transceiver. The transceiver may also be referred to as a communication interface or an interface circuit.

Figure 13:
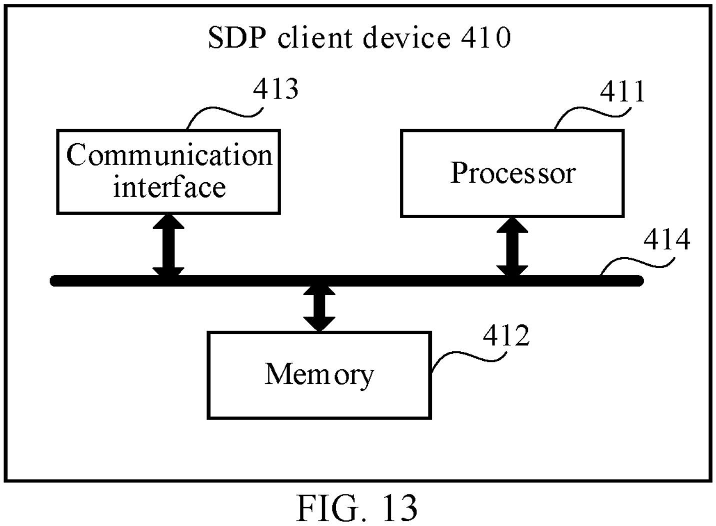
FIG. 13 is a diagram of another structure of an SDP client device according to an embodiment of this application.

FIG. 13 is a diagram of another structure of the access control apparatus 410 in the foregoing embodiment according to an embodiment of this application. The apparatus 410 may be used as an SDP client device or a chip built in an SDP client device. The apparatus 410 includes a processor 411, and may further include a memory 412, a communication interface 413, and a bus 414. The processor 411, the memory 412, and the communication interface 413 are connected by using the bus 414.

The processor 411 is configured to control and manage an action of the apparatus 410. In an embodiment, the processor 411 may be configured to support the apparatus 410 in performing one or more of steps of encrypting the device identifier of the SDP client device, generating the first packet to the third packet, and parsing the information sent by the SDP controller and the SDP gateway in the foregoing method embodiments. The communication interface 413 is configured to support the apparatus 410 in communicating, for example, support the apparatus 410 in communicating with an SDP controller and an SDP gateway.

In this embodiment of this application, the processor 411 may be a central processing unit, a general-purpose processor, a digital signal processor, an application-specific integrated circuit, a field programmable gate array or another programmable logic device, a transistor logic device, a hardware component, or any combination thereof. The processor 411 may implement or perform various example logical blocks, modules, and circuits described with reference to content disclosed in this application. Alternatively, the processor 411 may be a combination of processors implementing a computing function, for example, a combination of one or more microprocessors, or a combination of a digital signal processor and a microprocessor. The bus 414 in FIG. 13 may be a PCI bus, an EISA bus, or the like. The bus may include an address bus, a data bus, a control bus, and the like. For ease of representation, only one bold line is used to represent the bus in FIG. 13, but this does not mean that there is only one bus or only one type of bus.

Figure 14:
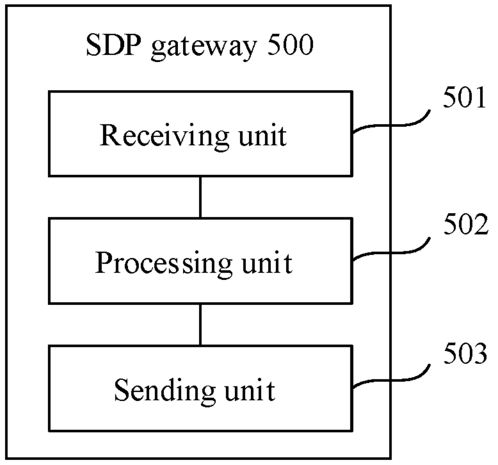
FIG. 14 is a diagram of a structure of an SDP gateway according to an embodiment of this application.

When an integrated unit is used, FIG. 14 is a diagram of a structure of an access control apparatus 500 according to an embodiment of this application. The apparatus 500 may be used as an SDP gateway or a chip built in an SDP gateway. The apparatus 500 includes a receiving unit 501, a processing unit 502, and a sending unit 503. The SDP gateway having the structure shown in FIG. 14 can implement functions of the SDP gateway in the solutions described in the foregoing method embodiments.

The receiving unit 501 is configured to receive client information sent by an SDP controller. The client information indicates that authentication on an SDP client device succeeds. The client information includes a device identifier of the SDP client device. The receiving unit 501 is further configured to receive a third packet sent by the SDP client device. A TCP option field of the third packet carries a device identifier of the SDP client device. The processing unit 502 is configured to determine, based on the device identifier included in the client information and the device identifier included in the third packet, whether the SDP client device is authorized. The sending unit 503 is configured to: if it is determined that the SDP client device is authorized, send the third packet to an application server, and forward, to the SDP client device, the service data returned by the application server.

In an embodiment, the third packet is an SYN packet. Optionally, the device identifier carried in the TCP option field is a device identifier in a ciphertext form. The processing unit 502 is further configured to decrypt the device identifier in the ciphertext form by using a sequence number of the SYN packet to obtain a first character string of a specified length. The first character string is used by the SDP gateway to determine whether the SDP client device is authorized. Further, the processing unit 502 is further configured to obtain a second character string of a specified length based on the device identifier included in the client information, compare the first character string with the second character string, and if the first character string is consistent with the second character string, determine that the SDP client device is authorized.

It should be noted that all related content of steps in the foregoing method embodiments may be cited in function descriptions of corresponding functional modules. Details are not described herein again.

Based on hardware implementation, the processing unit 502 in this embodiment of this application may be a processor of the apparatus 500, the receiving unit 501 may be a receiver of the apparatus 500, and the sending unit 503 may be a transmitter of the apparatus 500. The transmitter and the receiver may be integrated together to serve as a transceiver. The transceiver may also be referred to as a communication interface or an interface circuit.

Figure 15:
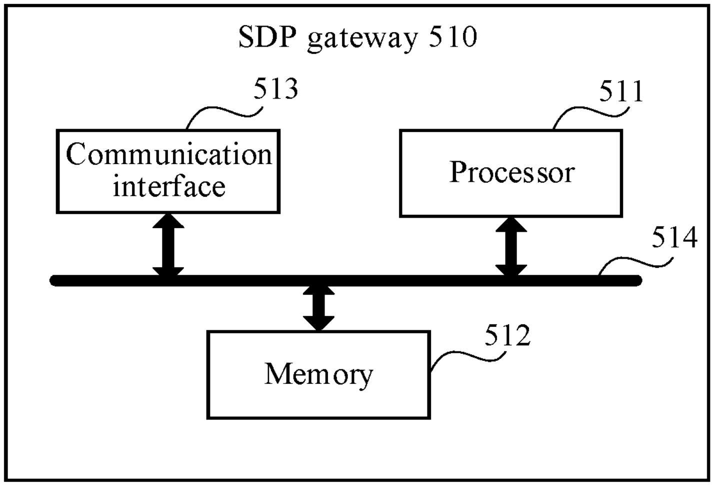
FIG. 15 is a diagram of another structure of an SDP gateway according to an embodiment of this application.

FIG. 15 is a diagram of another structure of the access control apparatus 510 in the foregoing embodiment according to an embodiment of this application. The apparatus 510 may be used as an SDP gateway or a chip built in an SDP gateway. The apparatus 510 includes a processor 511, and may further include a memory 512, a communication interface 513, and a bus 514. The processor 511, the memory 512, and the communication interface 513 are connected by using the bus 514.

The processor 511 is configured to control and manage an action of the apparatus 510. In an embodiment, the processor 511 may be configured to support the apparatus 510 in receiving S208 in the foregoing method embodiments, and/or another technical process described in this specification. The communication interface 513 is configured to support the apparatus 510 in communicating, for example, support the apparatus 510 in communicating with an SDP controller and an SDP client device.

In this embodiment of this application, the processor 511 may be a central processing unit, a general-purpose processor, a digital signal processor, an application-specific integrated circuit, a field programmable gate array or another programmable logic device, a transistor logic device, a hardware component, or any combination thereof. The processor 511 may implement or perform various example logical blocks, modules, and circuits described with reference to content disclosed in this application. Alternatively, the processor 511 may be a combination of processors implementing a computing function, for example, a combination of one or more microprocessors, or a combination of a digital signal processor and a microprocessor. The bus 514 in FIG. 15 may be a PCI bus, an EISA bus, or the like. The bus may include an address bus, a data bus, a control bus, and the like. For ease of representation, only one bold line is used to represent the bus in FIG. 15, but this does not mean that there is only one bus or only one type of bus.

An embodiment of this application further provides an access control system. The access control system may include an SDP controller, an SDP client device, and an SDP gateway. The SDP controller, the SDP client device, and the SDP gateway may be configured to implement any access control method according to the foregoing method embodiments.

It should be noted that all related content of steps in the foregoing method embodiments may be cited in function descriptions of corresponding functional modules. Details are not described herein again. The devices (the SDP controller, the SDP client device, and the SDP gateway) according to embodiments of this application are configured to perform functions of corresponding devices in the foregoing embodiments. Therefore, an effect the same as that in the foregoing method embodiments can be achieved.

All or some of functions, actions, operations, steps, and the like in the foregoing embodiments may be implemented by using software, hardware, firmware, or any combination thereof. When a software program is used, the functions, actions, operations, steps, and the like in the foregoing embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Based on this, an embodiment of this application further provides a computer-readable storage medium. The computer-readable storage medium includes computer instructions. When the computer instructions are run on a computer device, steps of the SDP controller in the foregoing method embodiments are performed.

According to still another aspect of this application, a computer-readable storage medium is provided. The computer-readable storage medium includes computer instructions. When the computer instructions are run on a computer device, steps of the SDP client device in the foregoing method embodiments are performed.

According to still another aspect of this application, a computer-readable storage medium is provided. The computer-readable storage medium includes computer instructions. When the computer instructions are run, steps of the SDP gateway in the foregoing method embodiments are performed.

According to still another aspect of this application, a computer program product including instructions is provided. When the computer program product runs on a computer device, the computer device is enabled to perform steps of the SDP controller in the foregoing method embodiments.

According to still another aspect of this application, a computer program product including instructions is provided. When the computer program product runs on a computer device, the computer device is enabled to perform steps of the SDP client device in the foregoing method embodiments.

According to still another aspect of this application, a computer program product including instructions is provided. When the computer program product runs on a computer device, the computer device is enabled to perform steps of the SDP gateway in the foregoing method embodiments.

In conclusion, the foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An access control method, comprising:

receiving, by a software defined perimeter (SDP) controller, a first packet sent by a first SDP client device, a transmission control protocol (TCP) option field of the first packet carrying a device identifier of the first SDP client device, the first packet is a synchronous (SYN) packet, the device identifier being generated based on related information about the first SDP client device;

performing, by the SDP controller, single-packet authentication on the first SDP client device based on the device identifier of the first SDP client device;

in response to the single-packet authentication on the first SDP client device fails, disabling, by the SDP controller, a TCP connection between the first SDP client device to which the first packet belongs and the SDP controller;

wherein the method further comprises:

receiving, by the SDP controller, a first packet sent by a second SDP client device, a TCP option field of the first packet sent by the second SDP client device carries a device identifier of the second SDP client device;

performing, by the SDP controller, single-packet authentication on the second SDP client device based on the device identifier of the second SDP client device;

in response to the single-packet authentication on the second SDP client device succeeds, receiving, by the SDP controller, a second packet sent by the second SDP client device, a transport layer security (TLS) option field or an application layer packet header of the second packet carries authentication information, and the authentication information comprises user information of the second SDP client device;

performing, by the SDP controller, user authentication on the second SDP client device based on the device identifier and the user information of the second SDP client device; and in response to the user authentication on the second SDP client device succeeds, sending, by the SDP controller, a resource list to the second SDP client device, the resource list comprises an application server identifier of at least one application server, the resource list allows for access by the second SDP client device.

2. The method according to claim 1, wherein the first packet and the second packet sent by the second SDP client device are in a same TCP connection, or the first packet and the second packet sent by the second SDP client device are in different TCP connections.

3. The method according to claim 1, wherein the device identifier carried in the first packet sent by the first SDP client device is in a ciphertext form, and the method further comprises:

decrypting, by the SDP controller, the device identifier in the ciphertext form using a sequence number of the SYN packet to obtain a character string of a specified length, wherein the character string being used by the SDP controller to perform the single-packet authentication on the first SDP client device.

4. The method according to claim 3, wherein the performing, by the SDP controller, the single-packet authentication on the first SDP client device based on the device identifier of the first SDP client device comprises:

comparing, by the SDP controller, the character string with a stored character string corresponding to each registered SDP client device, wherein the stored character string corresponding to the each registered SDP client device is generated based on a plainform text registered SDP client device identifier in a plaintext form of the each registered SDP client device; and if the character string is the same as a character string corresponding to the each registered SDP client device, determining that the single-packet authentication succeeded.

5. The method according to claim 1, wherein if the user authentication on the second SDP client device succeeded, the method further comprises:

sending, by the SDP controller, client information to an SDP gateway, the client information indicating that authentication on the second SDP client device succeeded, and the client information comprising the device identifier of the second SDP client device.

6. An access control method, comprising:

generating, by a software defined perimeter (SDP) client device, a device identifier, the device identifier being generated based on related information about the first SDP client device;

sending, by the software defined perimeter (SDP) client device, a first packet to an SDP controller, a transmission control protocol (TCP) option field of the first packet carrying the device identifier of the SDP client device;

receiving, by the SDP client device, a single-packet authentication response sent by the SDP controller;

if the single-packet authentication response indicates that single-packet authentication performed by the SDP controller on the SDP client device succeeded, sending, by the SDP client device, a second packet to the SDP controller, a transport layer security (TLS) option field or an application layer packet header of the second packet carrying authentication information, and the authentication information comprises user information of the SDP client device; and receiving, by the SDP client device, a resource list returned by the SDP controller, the resource list comprising an application server identifier of at least one application server, the resource list allowing for access by the SDP client device.

7. The method according to claim 6, wherein the first packet and the second packet are in a same TCP connection, or the first packet and the second packet are in different TCP connections.

8. The method according to claim 6, wherein the first packet is a synchronous (SYN) packet, wherein the device identifier carried in the TCP option field is in a ciphertext form, and the method further comprises:

obtaining a character string of a specified length based on the device identifier in a plaintext form; and encrypting the character string using a sequence number of the SYN packet to obtain the device identifier in the ciphertext form.

9. The method according to claim 8, wherein the character string of the specified length is obtained by performing a hash operation on the device identifier in the plaintext form.

10. The method according to claim 6, wherein after the receiving, by the SDP client device, the resource list returned by the SDP controller, the method further comprises:

sending, by the SDP client device, a third packet to a SDP gateway, wherein a TCP option field of the third packet carries a device identifier of the SDP client device; and receiving, by the SDP client device, service data returned by the application server, the service data being sent by the application server after the SDP gateway forwards the third packet to the application server after determining, based on the device identifier carried in the TCP option field of the third packet, that the SDP client device is authorized.

11. The method according to claim 10, wherein the third packet is a synchronous (SYN) packet.

12. A software defined perimeter (SDP) controller, comprising:

a memory storing instructions; and at least one processor in communication with the memory, the at least one processor configured, upon execution of the instructions, to perform the following steps:

receive a first packet sent by a first SDP client device, a transmission control protocol (TCP) option field of the first packet carrying a device identifier of the first SDP client device, the first packet is a synchronous (SYN) packet, the device identifier being generated based on related information about the first SDP client device;

perform single-packet authentication on the first SDP client device based on the device identifier of the first SDP client device;

in response to the single-packet authentication on the first SDP client device fails, disable a TCP connection between the first SDP client device to which the first packet belongs and the SDP controller;

wherein the method further comprises:

receiving, by the SDP controller, a first packet sent by a second SDP client device, a TCP option field of the first packet sent by the second SDP client device carries a device identifier of the second SDP client device;

performing, by the SDP controller, single-packet authentication on the second SDP client device based on the device identifier of the second SDP client device;

in response to the single-packet authentication on the second SDP client device succeeds, receiving, by the SDP controller, a second packet sent by the second SDP client device, a transport layer security (TLS) option field or an application layer packet header of the second packet carries authentication information, and the authentication information comprises user information of the second SDP client device;

performing, by the SDP controller, user authentication on the second SDP client device based on the device identifier and the user information of the second SDP client device; and in response to the user authentication on the second SDP client device succeeds, sending, by the SDP controller, a resource list to the second SDP client device, the resource list comprises an application server identifier of at least one application server, the resource list allows for access by the second SDP client device.

13. The SDP controller according to claim 12, wherein the first packet and the second packet sent by the second SDP client device are in a same TCP connection, or the first packet and the second packet sent by the second SDP client device are in different TCP connections.

14. The SDP controller according to claim 12, wherein the device identifier carried in the first packet sent by the first SDP client device is in a ciphertext form, the instructions when executed by the processor further cause the SDP controller to:

decrypt the device identifier in the ciphertext form using a sequence number of the SYN packet to obtain a character string of a specified length, wherein the character string being used by the SDP controller to perform the single-packet authentication on the first SDP client device.

15. The SDP controller according to claim 14, wherein the instructions when executed by the processor further cause the SDP controller to:

compare the character string with a stored character string corresponding to each registered SDP client device, wherein the stored character string corresponding to the each registered SDP client device is generated based on a plainform text registered SDP client device identifier in a plaintext form of the each registered SDP client device; and if the character string is the same as a character string corresponding to the each registered SDP client device, determine that the single-packet authentication succeeded.

16. The SDP controller according to claim 12, wherein if the user authentication on the second SDP client device succeeded, the instructions when executed by the processor further cause the SDP controller to:

send client information to an SDP gateway, the client information indicating that authentication on the second SDP client device succeeded, and the client information comprising the device identifier of the second SDP client device.

17. A software defined perimeter (SDP) client device, comprising:

a memory storing instructions; and at least one processor in communication with the memory, the at least one processor configured, upon execution of the instructions, to perform the following steps:

generate a device identifier based on related information about the first SDP client device;

send a first packet to an SDP controller, a transmission control protocol (TCP) option field of the first packet carrying the device identifier of the SDP client device;

receive a single-packet authentication response sent by the SDP controller;

if the single-packet authentication response indicates that single-packet authentication performed by the SDP controller on the SDP client device succeeded, send a second packet to the SDP controller, a transport layer security (TLS) option field or an application layer packet header of the second packet carrying authentication information, and the authentication information comprises user information of the SDP client device; and receive a resource list returned by the SDP controller, the resource list comprising an application server identifier of at least one application server, the resource list allowing for access by the SDP client device.

18. The SDP client device according to claim 17, wherein the first packet and the second packet are in a same TCP connection, or the first packet and the second packet are in different TCP connections.

19. The SDP client device according to any one of claim 17, wherein the first packet is a synchronous (SYN) packet.

20. The SDP client device according to claim 19, wherein the device identifier carried in the TCP option field is in a ciphertext form, and the instructions when executed by the processor further cause the SDP client device to:

obtain a character string of a specified length based on the device identifier in a plaintext form of the SDP client device, and encrypt the character string using a sequence number of the SYN packet to obtain the device identifier in the ciphertext form.

21. The SDP client device according to claim 20, wherein the character string of the specified length is obtained by performing a hash operation on the device identifier in the plaintext form.

22. The method according to claim 1, the device identifier being generated based on one or more of a primary hard disk sequence number of the first SDP client device, a media access control (MAC) information of a network adapter, or a central processing unit (CPU) sequence number.

23. The method according to claim 1, the device identifier being generated based on one or more of a primary hard disk sequence number of the first SDP client device, a media access control (MAC) information of a network adapter, or a central processing unit (CPU) sequence number, with the device identifier being further generated with reference to a current timestamp and a hash value generated by a random number.

24. The method according to claim 6, the device identifier being generated based on one or more of a primary hard disk sequence number of the first SDP client device, a media access control (MAC) information of a network adapter, or a central processing unit (CPU) sequence number.

25. The method according to claim 6, the device identifier being generated based on one or more of a primary hard disk sequence number of the first SDP client device, a media access control (MAC) information of a network adapter, or a central processing unit (CPU) sequence number, with the device identifier being further generated with reference to a current timestamp and a hash value generated by a random number.

* * * * *